US012502556B2

(12) United States Patent
Hirai et al.

(10) Patent No.: US 12,502,556 B2
(45) Date of Patent: Dec. 23, 2025

(54) MEDICAL IMAGE PROCESSING DEVICE, TREATMENT SYSTEM, MEDICAL IMAGE PROCESSING METHOD, AND STORAGE MEDIUM

(71) Applicants: Toshiba Energy Systems & Solutions Corporation, Kawasaki (JP); National Institutes for Quantum Science and Technology, Chiba (JP)

(72) Inventors: Ryusuke Hirai, Setagaya Tokyo (JP); Yukinobu Sakata, Kawasaki Kanagawa (JP); Akiyuki Tanizawa, Kawasaki Kanagawa (JP); Shinichiro Mori, Chiba (JP); Keiko Okaya, Setagaya Tokyo (JP)

(73) Assignees: TOSHIBA ENERGY SYSTEMS & SOLUTIONS CORPORATION, Kawasaki (JP); NATIONAL INSTITUTES FOR QUANTUM SCIENCE AND TECHNOLOGY, Chiba (JP)

( * ) Notice: Subject to any disclaimer, the term of this patent is extended or adjusted under 35 U.S.C. 154(b) by 375 days.

(21) Appl. No.: 18/096,810

(22) Filed: Jan. 13, 2023

(65) Prior Publication Data

US 2023/0149741 A1    May 18, 2023

Related U.S. Application Data

(63) Continuation of application No. PCT/JP2021/024950, filed on Jul. 1, 2021.

(30) Foreign Application Priority Data

Aug. 4, 2020  (JP) .................................. 2020-132537

(51) Int. Cl.
*A61N 5/10* (2006.01)
*G06T 7/20* (2017.01)

(52) U.S. Cl.
CPC ......... *A61N 5/1069* (2013.01); *A61N 5/1071* (2013.01); *G06T 7/20* (2013.01);
(Continued)

(58) Field of Classification Search
None
See application file for complete search history.

(56) References Cited

U.S. PATENT DOCUMENTS

2011/0058750 A1    3/2011  Rietzel
2015/0042643 A1    2/2015  Corp
(Continued)

FOREIGN PATENT DOCUMENTS

CN    104244831 A    12/2014
JP    2007-282877 A    11/2007
(Continued)

OTHER PUBLICATIONS

Office Action issued in Germany Patent Application No. 112021004133.9 on Jun. 7, 2024 (11 pages).
(Continued)

*Primary Examiner* — Hoon K Song
(74) *Attorney, Agent, or Firm* — Foley & Lardner LLP

(57) ABSTRACT

According to an embodiment, a medical image processing device includes a first image acquirer, a second image acquirer, a direction acquirer, and a movement amount calculator. The first image acquirer acquires a three-dimensional first image obtained by photographing the inside of a body of a patient. The second image acquirer acquires a three-dimensional second image of the inside of the body of the patient imaged at a timing different from that of the first image. The direction acquirer acquires information about an
(Continued)

irradiation direction of radiation to the patient in a treatment room. The movement amount calculator outputs a movement amount signal indicating the amount of movement of the second image to be moved to align the position of the patient shown in the second image with the position of the patient shown in the first image based on the path of the radiation set in the first image and the information about the irradiation direction.

15 Claims, 8 Drawing Sheets

(52) U.S. Cl.
CPC ............... *A61N 2005/1061* (2013.01); *A61N 2005/1074* (2013.01); *G06T 2207/30004* (2013.01)

(56) References Cited

U.S. PATENT DOCUMENTS

| | | | |
|---|---|---|---|
| 2015/0110246 A1 | 4/2015 | Liu et al. | |
| 2015/0360054 A1 | 12/2015 | Jeong | |
| 2017/0095197 A1* | 4/2017 | Kleiner | ............... A61B 6/486 |
| 2018/0193670 A1 | 7/2018 | Taguchi et al. | |
| 2019/0050999 A1 | 2/2019 | Piat et al. | |
| 2021/0268312 A1 | 9/2021 | Miyamoto et al. | |

FOREIGN PATENT DOCUMENTS

| | | |
|---|---|---|
| JP | 2009-189461 A | 8/2009 |
| JP | 5693388 B2 | 4/2015 |
| JP | 2016-059606 A | 4/2016 |
| JP | 2016-150082 A | 8/2016 |
| JP | 2017-035343 A | 2/2017 |
| JP | 2018-042831 A | 3/2018 |
| WO | WO-2018/051557 A1 | 3/2018 |
| WO | WO-2020/012785 A1 | 1/2020 |

OTHER PUBLICATIONS

KR Office Action for KR Appl. Ser. No. 10-2023-7000342 dated Feb. 27, 2025 (16 pages).
International Search Report and Written Opinion issued in corresponding application No. PCT/JP2021/024950 dated Sep. 21, 2021 (English).
KR Office Action-Notice of Allowance for KR Appl. Ser. No. 10-2023-7000342 dated May 2, 2025 (10 pages).
IN Office Action for IN Appl. Ser. No. 202317002982 dated Sep. 10, 2025 (7 pages).

* cited by examiner

MEDICAL IMAGE PROCESSING DEVICE, TREATMENT SYSTEM, MEDICAL IMAGE PROCESSING METHOD, AND STORAGE MEDIUM

CROSS-REFERENCE TO RELATED APPLICATION

This application is based upon and claims the benefit of priority from Japanese Patent Application No. 2020-132537, filed Aug. 4, 2020 and PCT/JP2021/024950, filed Jul. 1, 2021; the entire contents all of which are incorporated herein by reference.

FIELD

Embodiments of the present invention relate to a medical image processing device, a treatment system, a medical image processing method, and a storage medium.

BACKGROUND

Radiation treatment is a treatment method of irradiating a tumor (a lesion) within a patient's body with radiation to destroy the tumor. In the radiation treatment, it is necessary to accurately radiate the radiation to the position of the tumor because normal tissues within the patient's body that are irradiated with the radiation may be affected. Thus, when the radiation treatment is performed, computed tomography (CT) is first performed, for example, in advance in a treatment planning phase, and the position of the tumor within the patient's body is three-dimensionally ascertained. The radiation irradiation direction and the radiation irradiation intensity are planned on the basis of the ascertained position of the tumor. Thereafter, the position of the patient in a treatment phase is aligned with the position of the patient planned in the treatment planning phase and the tumor is irradiated with radiation in accordance with an irradiation direction or an irradiation intensity planned in the treatment planning phase.

In the position alignment of the patient in the treatment phase, image collation between a fluoroscopic image of the inside of the patient's body captured in a state in which the patient is laid on the patient table immediately before the start of treatment and a digitally reconstructed radiograph (DRR) image in which the fluoroscopic image is virtually reconstructed from a three-dimensional CT image captured at the time of the treatment planning is performed and the deviation in the position of the patient between images is obtained. The patient table is moved on the basis of the obtained deviation. Thereby, the position of a tumor, bone, or the like within the patient's body is aligned with that planned in the treatment plan.

The position deviation of the patient is obtained by seeking the position in the CT image so that the DRR image most similar to the fluoroscopic image is reconstructed. In the related art, many methods of automatically seeking the position of a patient using a computer have been proposed. However, a user (a doctor or the like) finally confirms an automated search result by comparing the fluoroscopic image with the DRR image in the related art.

At this time, it may be difficult to visually confirm the position of a tumor shown in a fluoroscopic image. This is because a tumor is more transparent to X-rays than a bone and the like and therefore is not clearly shown in a fluoroscopic image. Therefore, when treatment is performed, a CT image is captured instead of a fluoroscopic image to confirm the position of the tumor. In this case, the deviation in the patient's position is obtained by performing an image collation process between the CT image captured at the time of treatment planning and the CT image captured in the treatment phase, i.e., by performing an image collation process between the CT images.

In the image collation process between CT images, while the position of one CT image is shifted, the position of an image most similar to the other CT image is obtained. As an example of a method of performing the image collation process between CT images, for example, there is a method disclosed in Patent Document 1. In the method disclosed in Patent Document 1, the position of the most similar image is searched for as the position of a tumor by providing an image of the surroundings of the tumor included in the CT image captured at the time of treatment planning as a template and performing a template matching process for the CT image captured in the treatment phase. The position of the patient is aligned with a body posture that is the same as that at the time of treatment planning by obtaining deviation in a patient's position on the basis of a found position and moving the patient table in accordance with the deviation as described above. In the method disclosed in Patent Document 1, a search method in which a process of changing the orientation by tilting the template to perform a scan process as well as a process of three-dimensionally scanning the provided template is performed is described.

However, in the method disclosed in Patent Document 1, importance is put on a process of aligning the position of the surroundings of a target tumor with a CT image of surroundings of a tumor provided as a template. Thus, in the method disclosed in Patent Document 1, the position of tissue inside of the body of the patient is not necessarily accurate in areas other than the surroundings of the tumor. In other words, when the position of the patient is aligned using the method disclosed in Patent Document 1, even though radiated radiation reaches the tumor, it may be difficult to apply planned radiation energy to the tumor according to tissues within the patient's body in the path through which the radiation passes.

Meanwhile, the energy of radiation for use in radiation treatment is lost when the radiation passes through a substance. Thus, in the conventional treatment plan, the radiation irradiation method is determined by virtually calculating the amount of energy loss of radiated radiation on the basis of a captured CT image. Thinking about this, when the position of a patient is aligned in the treatment phase, it is important that the tissues within the patient's body in the path through which the radiation passes also be coincident therewith.

As an example of a method of performing an image collation process between CT images focusing on this point, for example, there is a method disclosed in Patent Document 2. In the method disclosed in Patent Document 2, the image collation process between the CT images is performed using CT images obtained by calculating and converting the arrival energy of radiation for each pixel. However, even in the method disclosed in Patent Document 2, when the image collation process is performed, the image collation process is performed using a DRR image reconstructed from a CT image after conversion. In other words, even in the method disclosed in Patent Document 2, the images for use in the image collation process are in a state in which three-dimensional image information included in the CT images is lost.

Furthermore, a method of combining the method disclosed in Patent Document 2 with the method disclosed in Patent Document 1 and aligning the position of the patient in template matching using CT images after conversion is conceivable. However, because the arrival energy calculation method changes with the radiation irradiation direction, it is necessary to recalculate the arrival energy every time the orientation of the template for use in template matching is changed. Thus, when the case where, even if the method disclosed in Patent Document 2 is combined with the method disclosed in Patent Document 1, it is necessary to provide a large number of templates in accordance with the orientation and the position is aligned by paying attention to the surroundings of the tumor is considered, it is difficult to perform position alignment including tissues within the patient's body in the path through which the radiation passes.

DETAILED DESCRIPTION

According to an aspect of an embodiment, a medical image processing device includes a first image acquirer, a second image acquirer, a direction acquirer, and a movement amount calculator. The first image acquirer acquires a three-dimensional first image obtained by photographing the inside of a body of a patient. The second image acquirer acquires a three-dimensional second image of the inside of the body of the patient imaged at a timing different from that of the first image. The direction acquirer acquires information about an irradiation direction of radiation to the patient in a treatment room. The movement amount calculator outputs a movement amount signal indicating the amount of movement of the second image to be moved to align the position of the patient shown in the second image with the position of the patient shown in the first image based on the path of the radiation set in the first image and the information about the irradiation direction.

Hereinafter, a medical image processing device, a treatment system, a medical image processing method, and a storage medium according to embodiments will be described with reference to the drawings.

First Embodiment

Figure 1:
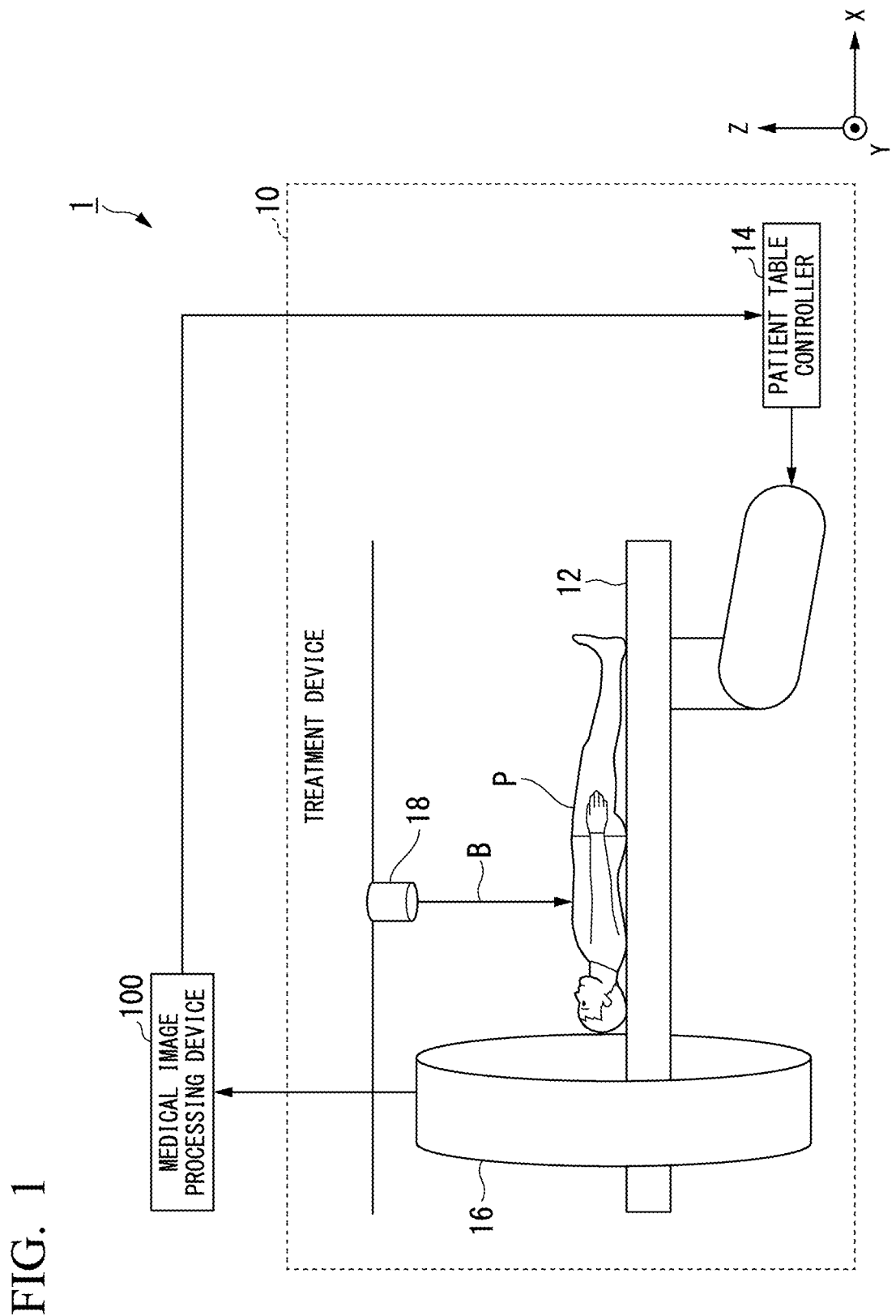
FIG. 1 is a block diagram showing a schematic configuration of a treatment system including a medical image processing device of a first embodiment.

FIG. 1 is a block diagram showing a schematic configuration of a treatment system including a medical image processing device of a first embodiment. A treatment system 1 includes, for example, a treatment device 10 and a medical image processing device 100. The treatment device 10 includes, for example, a patient table 12, a patient table controller 14, a computed tomography (CT) device 16 (hereinafter referred to as a "CT photography device 16"), and a treatment beam irradiation gate 18.

The patient table 12 is a movable treatment table to which a subject (a patient) P who is to be treated with radiation is fixed in a lying state, for example, by a fixture or the like. Under control of the patient table controller 14, the patient table 12 moves into the ring-shaped CT photography device 16 having an opening in a state in which the patient P is fixed thereto. The patient table controller 14 controls a translation mechanism and a rotation mechanism provided on the patient table 12 to change the direction of irradiation of a treatment beam B to the patient P fixed to the patient table 12 in accordance with a movement amount signal output from the medical image processing device 100. The translation mechanism can drive the patient table 12 in triaxial directions and the rotation mechanism can drive the patient table 12 around three axes. Thus, the patient table controller 14 controls, for example, the translation mechanism and the rotation mechanism of the patient table 12 so that the patient table 12 moves at six degrees of freedom. The degrees of freedom at which the patient table controller 14 controls the patient table 12 may not be six degrees of freedom and may be fewer than six degrees of freedom (for example, four degrees of freedom or the like) or more than six degrees of freedom (for example, eight degrees of freedom or the like).

The CT photography device 16 is an imaging device for performing three-dimensional computed tomography. The CT photography device 16 has a plurality of radiation sources arranged inside of a ring-shaped opening and radiates radiation for fluoroscopy inside of the body of the patient P from each radiation source. That is, the CT photography device 16 irradiates the patient P with radiation from a plurality of positions near the patient. Radiation radiated from each radiation source in the CT photography device 16 is, for example, X-rays. The CT photography device 16 detects the radiation radiated from the corresponding radiation source and reaching the inside of the body of the patient P using a plurality of radiation detectors arranged inside of the ring-shaped opening. The CT photography device 16 generates a CT image of the inside of the patient P on the basis of a magnitude of radiation energy detected by each radiation detector. A CT image of the patient P generated by the CT photography device 16 is a three-dimensional digital image in which the magnitude of the radiation energy is represented by a digital value. The CT photography device 16 outputs the generated CT image to the medical image processing device 100. For example, a photography controller (not shown) controls the three-dimensional photography of the inside of the body of the patient P by the CT photography device 16, i.e., the irradiation of radiation from each radiation source and the generation of a CT image based on the radiation detected by each radiation detector.

The treatment beam irradiation gate 18 radiates radiation as a treatment beam B for destroying a tumor (a lesion), which is a site to be treated inside of the patient P's body. The treatment beam B is, for example, X-rays, γ-rays, an electron beam, a proton beam, a neutron beam, a heavy particle beam, or the like. The treatment beam B is linearly radiated from the treatment beam irradiation gate 18 to the patient P (more specifically, the tumor inside of the body of the patient P). Irradiation of the treatment beam B at the treatment beam irradiation gate 18 is controlled by, for example, a treatment beam irradiation controller (not shown). In the treatment system 1, the treatment beam irradiation gate 18 is an example of an "irradiator" in the claims.

In a treatment room where the treatment system 1 is installed, three-dimensional coordinates of a reference position as shown in FIG. 1 are preset. In the treatment room where the treatment beam B is radiated to the patient P, an installation position of the treatment beam irradiation gate 18, the direction in which the treatment beam B is radiated (an irradiation direction), an installation position of the patient table 12, an installation position of the CT photography device 16, a photography position of a CT image obtained by photographing the inside of the patient P, or the like is ascertained in accordance with the preset three-dimensional coordinates of the reference position. In the following description, the three-dimensional coordinate system of the preset reference position in the treatment room is defined as a "room coordinate system." In the following description, it is assumed that a "position" is the position of (three-dimensional) coordinates in the triaxial directions based on the translation mechanism of the patient table 12 and an "orientation" is an orientation of a rotation angle around three axes based on the rotation mechanism provided in the patient table 12 represented by the room coordinate system. For example, the position of the patient table 12 is the position of a prescribed point included in the patient table 12 represented by three-dimensional coordinates and the orientation of the patient table 12 is represented by a rotation angle of the patient table 12 in yaw, roll, and pitch.

In radiation treatment, a treatment plan is created in a situation in which the treatment room is simulated. That is, in the radiation treatment, an irradiation direction, an intensity, and the like when the patient P is irradiated with the treatment beam B are planned by simulating a state in which the patient P is placed on the patient table 12 in the treatment room. Thus, information such as parameters indicating the position and the orientation of the patient table 12 within the treatment room is added to the CT image in the phase of treatment planning (the treatment planning phase). The same is also true for CT images captured immediately before radiation treatment and CT images captured during previous radiation treatment. In other words, parameters indicating the position and orientation of the patient table 12 at the time of photography are assigned to a CT image obtained by photographing the inside of the body of the patient P with the CT photography device 16.

Although the configuration of the treatment device 10 including the CT photography device 16 and one treatment beam irradiation gate 18 that has been fixed is shown in FIG. 1, the configuration of the treatment device 10 is not limited to the above-described configuration. For example, instead of the CT photography device 16, the treatment device 10 may be a configuration including a photography device for generating an image obtained by three-dimensionally photographing the inside of the body of the patient P such as a CT photography device in which a set of a radiation source and a radiation detector rotates inside of a ring-shaped opening, a cone-beam (CB) CT device, a magnetic resonance imaging (MRI) device, or an ultrasonic diagnostic device. For example, the treatment device 10 may have a configuration including a plurality of treatment beam irradiation gates such as a configuration further including a treatment beam irradiation gate for irradiating the patient P with the treatment beam from the horizontal direction. For example, the treatment device 10 may have a configuration in which the patient P is irradiated with treatment beams from various directions when the one treatment beam irradiation gate 18 shown in FIG. 1 performs the rotation around the patient P such as the rotation of 360 degrees about a rotation axis of a horizontal direction X shown in FIG. 1. For example, instead of the CT photography device 16, the treatment device 10 includes one or more imaging devices each including a set of a radiation source and a radiation detector and may be configured to photograph the inside of the body of the patient P from various directions when the imaging devices rotate 360 degrees about the rotation axis of the horizontal direction X shown in FIG. 1. This configuration is referred to as a rotating gantry type treatment device. In this case, for example, one treatment beam irradiation gate 18 shown in FIG. 1 may be configured to rotate around the same rotation axis simultaneously with the imaging device.

The medical image processing device 100 performs a process for aligning the position of the patient P when radiation treatment is performed, on the basis of a CT image output by the CT photography device 16. More specifically, the medical image processing device 100 performs, for example, a process for aligning the position of a tumor or tissues located inside of the body of the patient P on the basis of a CT image of the patient P captured before radiation treatment is performed in a treatment planning phase or the like and a current CT image of the patient P captured by the CT photography device 16 in the phase of treatment (the treatment phase) in which radiation treatment is performed. The medical image processing device 100 outputs a movement amount signal for moving the patient table 12 to the patient table controller 14 so that the irradiation direction of the treatment beam B radiated from the treatment beam irradiation gate 18 is aligned with the direction set in the treatment planning phase. That is, the medical image processing device 100 outputs a movement amount signal for moving the patient P in a direction in which the treatment beam B is appropriately applied to the tumor or tissues to be treated in the radiation treatment to the patient table controller 14.

The medical image processing device 100 and the patient table controller 14 and the CT photography device 16 provided in the treatment device 10 may be connected by wire or may be wirelessly connected by, for example, a local area network (LAN), a wide area network (WAN), or the like.

Figure 2:
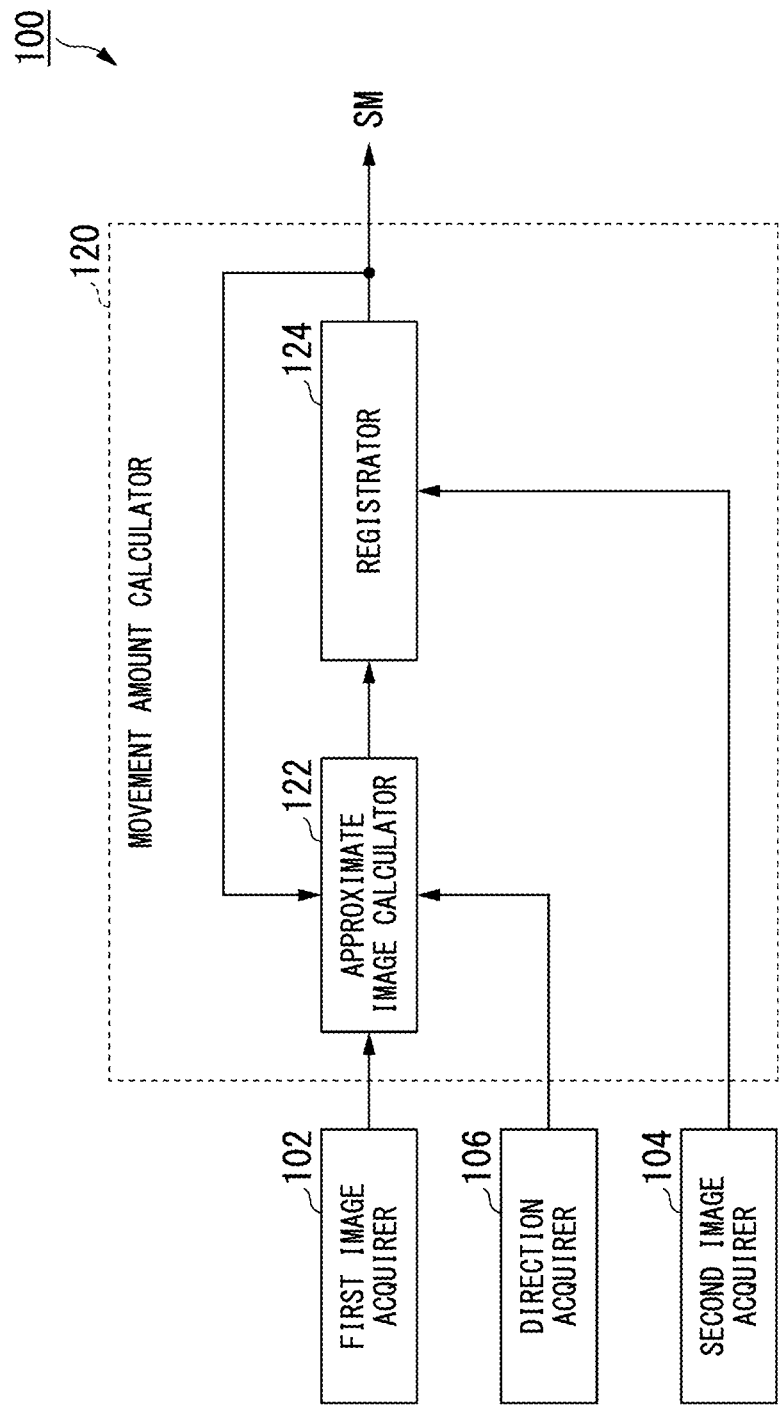
FIG. 2 is a block diagram showing a schematic configuration of the medical image processing device of the first embodiment.

The medical image processing device 100 of the first embodiment will be described below. FIG. 2 is a block diagram showing a schematic configuration of the medical image processing device 100 of the first embodiment. The medical image processing device 100 includes, for example, a first image acquirer 102, a second image acquirer 104, a direction acquirer 106, and a movement amount calculator 120. The movement amount calculator 120 includes, for example, an approximate image calculator 122 and a registrator 124.

Some or all of the components provided in the medical image processing device 100 are implemented by, for example, a hardware processor such as a central processing unit (CPU) executing a program (software). Also, some or all of these components may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Also, some or all of the functions of the components provided in the medical device may be implemented by a dedicated LSI circuit. The program may be pre-stored in a storage device (a storage device including a non-transitory storage medium) such as a read only memory (ROM), a random-access memory (RAM), a hard disk drive (HDD), or a flash memory provided in the medical image processing device 100 or may be stored in a removable storage medium (a non-transitory storage medium) such as a DVD or a CD-ROM and installed in the HDD or the flash memory provided in the medical image processing device 100 when the storage medium is mounted in a drive device provided in the medical image processing device 100. Also, the program may be downloaded in advance from another computer device via the network and installed in the HDD or the flash memory provided in the medical image processing device 100.

The first image acquirer 102 acquires a first image related to the patient P before treatment and parameters indicating the position and the orientation when the first image has been captured. The first image is a three-dimensional CT image representing a three-dimensional shape inside of the body of the patient P captured by, for example, the CT photography device 16 in the treatment planning phase when radiation treatment is performed. The first image is used to determine the direction (a path including an inclination, a distance, and the like) and an intensity of the treatment beam B to be radiated to the patient P in radiation treatment. The determined direction (irradiation direction) and intensity of the treatment beam B are set in the first image. The first image is captured in a state in which the patient P is fixed to the patient table 12 and the uniform position and orientation of the patient P (hereinafter referred to as a "body posture") are maintained. A parameter indicating the body posture of the patient P when the first image has been captured may be the position or the orientation (a photography direction or photography magnification) of the CT photography device 16 when the first image has been captured or may be a setting value set in the translation mechanism and the rotation mechanism provided in the patient table 12, for example, so that the position and the orientation of the patient table 12 when the first image has been captured, i.e., the body posture of the patient P, are maintained uniformly. The first image acquirer 102 outputs the acquired first image and parameters to the movement amount calculator 120. If the first image is an image captured before radiation treatment is performed, for example, it may be an image captured immediately before treatment is performed in the treatment room or an image captured during previous radiation treatment. The first image acquirer 102 may have an interface for connecting to the CT photography device 16 provided in the treatment device 10.

The second image acquirer 104 acquires a second image of the patient P immediately before radiation treatment starts and parameters indicating the position and the orientation when the second image has been captured. The second image is, for example, a three-dimensional CT image representing the three-dimensional shape inside of the body of the patient P captured by the CT photography device 16 so that the body posture of the patient P is aligned when the treatment beam B is radiated in the radiation treatment. That is, the second image is an image captured by the CT photography device 16 in a state in which the treatment beam B is not radiated from the treatment beam irradiation gate 18. In other words, the second image is a CT image captured at a timing different from a timing when the first image has been captured. In this case, photography timings of the first image and the second image are different from each other, but image capturing methods for the first image and the second image are similar to each other. Thus, the second image is captured in a body posture similar to the body posture when the first image has been captured. A parameter indicating the body posture of the patient P when the second image has been captured may be the position or the orientation (a photography direction or photography magnification) of the CT photography device 16 when the second image has been captured or may be a set value set in the translation mechanism and the rotation mechanism provided in the patient table 12, for example, so that the position and the orientation of the patient table 12 when the second image has been captured, i.e., the body posture of the patient P, are close to a body posture similar to that when the first image has been captured. The second image acquirer 104 outputs the acquired second image and parameters to the movement amount calculator 120. The second image acquirer 104 may have an interface for connecting to the CT photography device 16 provided in the treatment device 10. This interface may be the same as the interface provided in the first image acquirer 102.

The second image is not limited to a CT image captured by the CT photography device 16 and may be a three-dimensional image captured by an imaging device different from the CT photography device 16, for example, such as a CBCT device, an MRI device, or an ultrasonic diagnostic device. For example, the first image may be a CT image and the second image may be a three-dimensional image captured by an MRI device. In contrast, the first image may be a three-dimensional image captured by an MRI device, and the second image may be a CT image.

The direction acquirer 106 acquires information about the direction within the treatment room (hereinafter referred to as "direction information"). The direction information is information expressed in a preset room coordinate system. The direction information includes, for example, information indicating the irradiation direction of the treatment beam B and information indicating the movement direction of the patient table 12.

The information indicating the irradiation direction of the treatment beam B is information indicating the direction in which the treatment beam irradiation gate 18 irradiates the patient P with the treatment beam B within the treatment room. Although the treatment device 10 may have a configuration in which the treatment beam irradiation gate 18 is fixed as shown in FIG. 1, for example, the configuration in which treatment beams B are radiated from both vertical and horizontal directions or the configuration in which the treatment beam irradiation gate 18 can rotate about the same rotation axis simultaneously with the imaging device and radiate the treatment beams B from various directions as described above are also conceivable. Furthermore, the treatment beam B may be radiated to a region (a range) of a tumor located inside of the body of the patient P by sending a radiation beam in a scan (a raster scan) or radiating the radiation beam within a planar range having a prescribed size. That is, there may be a plurality of paths when a tumor inside of the body of the patient P is irradiated in the irradiation direction of the treatment beam B. In these cases, the direction acquirer 106 acquires all irradiation directions (including a plurality of paths) in which the treatment beam B can be radiated within the treatment room as information indicating the irradiation direction of the treatment beam B.

The information indicating the movement direction of the patient table 12 is information indicating the direction in which the fixed patient P can be moved when the treatment beam B is radiated by the patient table 12 installed in the treatment room. The information indicating the movement direction of the patient table 12 also includes information indicating an angle at which the body posture of the patient P can be changed by the patient table 12. For example, the patient table 12 can move the position and the orientation at six degrees of freedom by the translation mechanism and the rotation mechanism as described above. Thus, the information indicating the movement direction of the patient table 12 may be information of the direction of the patient table 12 at the six degrees of freedom. The information indicating the movement direction of the patient table 12 may be information indicating a range of a setting value that can be set in the translation mechanism and the rotation mechanism. As described above, when the patient table 12 moves at less than six degrees of freedom (for example, four degrees of freedom), the direction acquirer 106 acquires information corresponding to the degrees of freedom to which the patient table 12 moves. The case where the movement of the patient table 12 follows a unique coordinate system different from the preset room coordinate system in the treatment room is also conceivable. In this case, the direction acquirer 106 may acquire information about the movement direction in the unique coordinate system followed by the patient table 12 as information indicating the movement direction of the patient table 12.

The direction acquirer 106 outputs the acquired information indicating the irradiation direction of the treatment beam B and the acquired information indicating the movement direction of the patient table 12 as direction information to the movement amount calculator 120.

The movement amount calculator 120 determines the amount of movement of the patient table 12 for aligning the body posture of the patient P shown in the second image output by the second image acquirer 104 with the body posture of the patient P shown in the first image on the basis of the first image output by the first image acquirer 102 and the direction information output by the direction acquirer 106. Thereby, the movement amount calculator 120 determines the amount of movement of the patient table 12 for aligning the current body posture of the patient P with the body posture of the patient P in the treatment planning phase so that energy applied to the tumor inside of the body of the patient P by the treatment beam B that has been radiated is close to energy planned in the treatment planning phase. The movement amount calculator 120 outputs a movement amount signal SM indicating the determined amount of movement of the patient table 12 to the patient table controller 14 provided in the treatment device 10. Thereby, the patient table controller 14 causes the patient table 12 to move so that the current body posture of the patient P is close to the body posture of the patient P in the treatment planning phase in accordance with the movement amount signal SM output by the movement amount calculator 120.

The approximate image calculator 122 calculates an approximate image obtained by slightly moving the first image on the basis of the first image and the parameters indicating the position and orientation of the first image output by the first image acquirer 102 and the direction information output by the direction acquirer 106. More specifically, the approximate image calculator 122 first calculates an image obtained by slightly moving the first image in the room coordinate space independently with respect to each of one or more coordinate axes represented by the direction information. For example, six images each obtained by making a shift by a prescribed width are calculated in the movement directions of the six degrees of freedom of the patient table. Subsequently, six difference images between these six images and an image before movement are calculated and an approximate image is calculated by multiplying each difference image by a reciprocal of the prescribed width. The approximate image calculator 122 outputs the calculated approximate image to the registrator 124. The approximate image calculator 122 calculates an approximate image using a similar procedure for the first image after the movement on the basis of information indicating that there is deviation between the first image moved by the amount of movement output by the registrator 124 and a second image (wherein the information may be information of the amount of deviation between the first image and the second image) and outputs the calculated approximate image to the registrator 124 again.

The registrator 124 calculates amounts of deviation in the position and orientation between the first image and the second image on the basis of the approximate image output by the approximate image calculator 122 and the second image and the parameters indicating the position and the orientation of the second image output by the second image acquirer 104. When the approximate image calculator 122 calculates an approximate image generated by making a shift by a prescribed width for each direction (each degree of freedom) in which the body posture of the patient P shown in the first image changes, the registrator 124 calculates amounts of deviation in the position and orientation between the first image and the second image for each direction. The registrator 124 determines the amount of movement of the patient table 12 for aligning the current body posture of the patient P shown in the second image with the body posture of the patient P in the treatment planning phase shown in the first image on the basis of the calculated amount of deviation and outputs a movement amount signal SM indicating the determined amount of movement of the patient table 12 to the patient table controller 14.

The movement amount calculator 120 iterates an approximate image calculation process in the approximate image calculator 122 and a deviation amount calculation process and a process of deciding the amount of movement of the patient table 12 in the registrator 124 until it is determined that the current body posture of the patient P has been aligned with the body posture of the patient P in the treatment planning phase. This determination is made by the registrator 124. This determination may be made by a determiner (not shown) provided in the movement amount calculator 120. When the registrator 124 determines that the current body posture of the patient P has been aligned with the body posture of the patient P in the treatment planning phase, the movement amount calculator 120 outputs the determined final amount of movement of the patient table 12 (including an inclination, a distance, and the like) to the patient table controller 14. Thereby, the patient table controller 14 causes the patient table 12 to move by controlling the translation mechanism and the rotation mechanism in accordance with the movement amount signal SM output by the movement amount calculator 120, so that the body posture of the patient P fixed to the patient table 12 is actually moved. Thereby, the treatment system 1 including the medical image processing device 100 can perform the radiation treatment by aligning the current body posture of the patient P in a state in which the treatment beams B of energy planned in the treatment planning phase can be radiated to a tumor inside of the body of the patient P.

Figure 3:
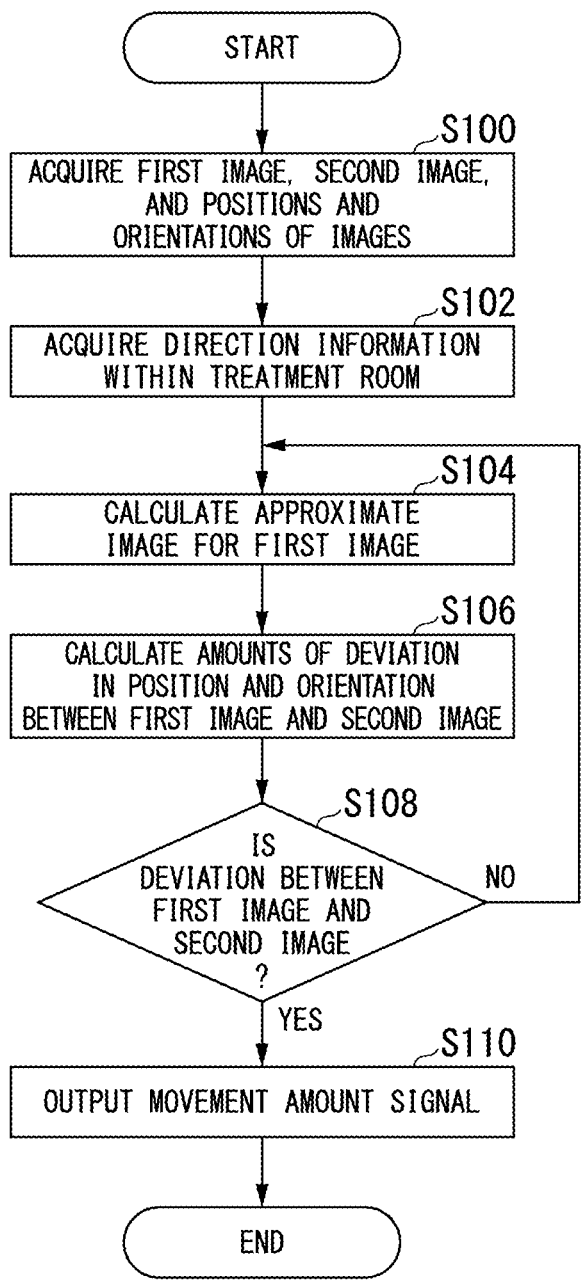
FIG. 3 is a flowchart showing a flow of a process in which the medical image processing device of the first embodiment calculates the amount of movement of a patient table.

Hereinafter, a flow of a process for deciding the amount of movement of the patient table 12 so that the current body posture of the patient P is aligned with the body posture of the patient P in the treatment planning phase (a movement amount calculation process) in the medical image processing device 100 will be described. FIG. 3 is a flowchart showing a flow of a process of calculating the amount of movement of the patient table 12 in the medical image processing device 100 of the first embodiment. Before the medical image processing device 100 performs the movement amount calculation process, i.e., before radiation treatment is performed (for example, about one week ago), a treatment plan is created on the basis of the captured first image. Furthermore, the second image is captured immediately before the medical image processing device 100 performs the movement amount calculation process, i.e., immediately before the radiation treatment is started. In the radiation treatment, the treatment beam B may be radiated a plurality of times (the case where radiation is performed on different days is also included) so that the same patient P is treated. Thus, when the radiation treatment for the same patient P is performed for the second time or later, another treatment plan may be further created using the second image obtained by aligning the position of the patient P in the previous treatment as the first image.

Because the present invention mainly focuses on the process of aligning the position of the patient P when radiation treatment is performed in the treatment system 1, further detailed description of a process when each image of the first image and the second image (here, each CT image) is captured will be omitted. In the following description, it is assumed that the treatment plan based on the first image has been completed and the capturing of the second image has already been completed in the treatment system 1.

First, when the medical image processing device 100 starts a movement amount calculation process, the first image acquirer 102 acquires the first image and the parameters indicating the position and the orientation of the first image and the second image acquirer 104 acquires the second image and the parameters indicating the position and the orientation of the second image (step S100). The first image acquirer 102 outputs the acquired first image and the acquired parameters of the first image to the approximate image calculator 122 provided in the movement amount calculator 120. The second image acquirer 104 outputs the acquired second image and the acquired parameters of the second image to the registrator 124.

Subsequently, the direction acquirer 106 acquires direction information within the treatment room (step S102). The direction acquirer 106 outputs the acquired direction information to the approximate image calculator 122 provided in movement amount calculator 120.

Subsequently, the approximate image calculator 122 calculates an approximate image associated with the first image on the basis of the first image and the parameters indicating the position and orientation of the first image output by the first image acquirer 102 and the direction information output by the direction acquirer 106 (step S104). The approximate image calculator 122 outputs the calculated approximate image to the registrator 124.

Subsequently, the registrator 124 calculates amounts of deviation in the position and orientation between the first image and the second image on the basis of the approximate image output by the approximate image calculator 122 and the second image and the parameters of the second image output by the second image acquirer 104 (step S106).

Subsequently, the registrator 124 determines whether or not each of the calculated amounts of deviations in the position and orientation between the first image and the second image is less than or equal to the amount of deviation at which it can be determined that there is no deviation between the first image and the second image (step S108). In other words, the registrator 124 determines whether or not the current body posture of the patient P has been aligned with the body posture of the patient P in the treatment planning phase. The fact that the current body posture of the patient P has been aligned with the body posture of the patient P in the treatment planning phase indicates, for example, that the calculated amount of deviation between the first image and the second image is less than or equal to a threshold value indicating a prescribed allowable range of the amount of deviation.

When a result of the determination in step S108 indicates that it is determined that there is deviation between the first image and the second image, the registrator 124 outputs calculated information indicating that there is deviation between the first image and the second image to the approximate image calculator 122. Thereby, the movement amount calculation process of the medical image processing device 100 returns to step S104 and iterates the processing of steps S104 to S108. That is, in the movement amount calculation process of the medical image processing device 100, a process in which the approximate image calculator 122 calculates an approximate image of the first image and a process in which the registrator 124 calculates the amount of deviation between the first image and the second image and determines the calculated amount of deviation are iterated.

On the other hand, when a result of the determination in step S108 indicates that it is determined that there is no deviation between the first image and the second image, the registrator 124 determines the amount of movement of the patient table 12 on the basis of the calculated amount of deviation between the first image and the second image. The registrator 124 outputs a movement amount signal SM indicating the determined amount of movement of the patient table 12 to the patient table controller 14 (step S110).

Thereby, in the treatment system 1, the patient table controller 14 causes the patient table 12 to move and causes the position of the patient P to move actually on the basis of the movement amount signal SM output by the medical image processing device 100 (more specifically, the registrator 124 provided in the movement amount calculator 120).

Next, an example of a process (a processing method) performed by the component of the medical image processing device 100 in the movement amount calculation process of the medical image processing device 100 will be described.

First, the treatment plan performed before the movement amount calculation process of the medical image processing device 100 is performed will be described. In the treatment plan, energy of treatment beams B (radiation) radiated to the patient P, an irradiation direction, a shape of the irradiation range, and a distribution of doses when the treatment beams B are divided and radiated a plurality of times, and the like are defined. More specifically, first, a planner (a doctor or the like) of the treatment plan first designates a boundary between a region of a tumor (a lesion) and a normal tissue region, a boundary between the tumor and a vital organ near the tumor, and the like with respect to the first image that has been captured (for example, a CT image captured by the CT photography device 16) in the treatment planning phase. In the treatment plan, the direction in which the treatment beam B is radiated (a path through which the treatment beam B passes), an intensity, or the like is determined on the basis of a depth from a body surface of the patient P to the position of a tumor or a size of the tumor calculated from information about the tumor designated by the planner (a doctor or the like) of the treatment plan.

The designation of the boundary between the tumor region and the normal tissue region described above corresponds to the designation of the position and a volume of the tumor. The volume of this tumor is referred to as a gross tumor volume (GTV), a clinical target volume (CTV), an internal target volume (ITV), a planning target volume (PTV), or the like. The GTV is a volume of the tumor capable of being visually confirmed from the image and is a volume required to be irradiated with a sufficient dose of the treatment beam B in radiation treatment. The CTV is a volume including the GTV and a latent tumor to be treated. The ITV is a volume obtained by adding a prescribed margin to the CTV in consideration of the movement of the CTV due to predicted physiological movement of the patient P and the like. The PTV is a volume obtained by adding a margin to the ITV in consideration of an error in position alignment of the patient P performed when treatment is performed. The relationship of the following Eq. (1) is established between these volumes.

[Math. 1]

$$GTV \subseteq CTV \subseteq ITV \subseteq PTV \quad (1)$$

On the other hand, a volume of a vital organ located near the tumor, which is highly sensitive to radiation and strongly affected by the dose of irradiated radiation, is referred to as an organ at risk (OAR). A planning organ at risk volume (PRV) is designated as a volume obtained by adding a prescribed margin to the OAR. The PRV is designated by adding a volume (a region) to which the radiation is radiated as a margin while avoiding the OAR which is not desired to be destroyed by the radiation. The relationship of the following Eq. (2) is established between these volumes.

[Math. 2]

$$OAR \subseteq PRV \quad (2)$$

In the treatment planning phase, the direction (path) or intensity of the treatment beam B (radiation) radiated to the patient P is determined on the basis of the margin in consideration of an error that may occur in actual treatment.

Subsequently, in the treatment phase of radiation treatment, when the medical image processing device 100 performs the movement amount calculation process, the first image acquirer 102 first acquires the first image and the parameters indicating the position and orientation of the first image and outputs the first image and the parameters to the approximate image calculator 122 provided in the movement amount calculator 120. The second image acquirer 104 acquires the second image of the patient P immediately before treatment starts and the parameters indicating the position and orientation of the second image and outputs the acquired first image and parameters to the registrator 124 provided in the movement amount calculator 120. The direction acquirer 106 acquires the direction information within the treatment room and outputs the direction information to the approximate image calculator 122 provided in the movement amount calculator 120.

As described above, both the first image and the second image are three-dimensional CT images. When the second image is captured, the body posture of the patient P is brought close to a body posture similar to that when the first image has been captured. However, it is difficult to capture the second image in the body posture of the patient P that is completely the same as that when the first image was captured. In other words, it is difficult to suppress a change in a state inside of the patient P and to fix the patient in the same body posture even with the use of fixtures. Thus, even if the first image and the second image are virtually identically arranged within a prescribed three-dimensional space, slight deviation (of, for example, several millimeters (mm)) may occur and it is difficult to reproduce the body posture of the patient P when the first image has been captured only by capturing the second image. Therefore, in the movement amount calculation process of the medical image processing device 100, the approximate image calculator 122 provided in the movement amount calculator 120 calculates an approximate image for the first image and the registrator 124 determines the amount of movement of the patient table 12 for aligning positions of the body posture shown in the first image and the body posture shown in the second image by calculating amounts of deviation in the position and orientation between the first image and the second image. That is, the medical image processing device 100 determines the amount of movement of the patient table 12 for reproducing the body posture of the patient P when the first image has been captured in the movement amount calculation process. The prescribed three-dimensional space is the space of the room coordinate system preset in the treatment room.

(Movement Amount Calculation Method)

Next, a calculation method in which the movement amount calculator 120 calculates the amount of movement for moving the patient table 12 in the movement amount calculation process of the medical image processing device 100 will be described. First, an approximate image calculation method in the approximate image calculator 122 provided in the movement amount calculator 120 will be described.

In the following description, a pixel (a voxel) included in the first image virtually arranged in a prescribed three-dimensional space according to the room coordinate system is denoted by $I_i(V)$. At the pixel $I_i(V)$, Eq. (3) represents a three-dimensional position within the room coordinate system, and V denotes the position and orientation vector when the first image is arranged in a prescribed three-dimensional space. The vector V has dimensions equal in number to the number of axes indicated in the direction information output from the direction acquirer 106, and is, for example, a six-dimensional vector in the case of the six degrees of freedom.

[Math. 3]

$$i \in R^3 \quad (3)$$

The vector V may have a small number of dimensions corresponding to the direction of degrees of freedom when the movement of the patient table 12 is controlled as described above. For example, if the direction of the degrees of freedom for controlling the movement of the patient table 12 is the direction of the four degrees of freedom, the vector V may be a four-dimensional vector. On the other hand, the number of dimensions of the vector V may be increased by adding the irradiation direction of the treatment beam B to the movement direction of the patient table 12 on the basis of the direction information output by the direction acquirer 106. For example, when the irradiation directions of the treatment beam B included in the direction information are two directions that are the vertical direction and the horizontal direction and the movement direction of the patient table 12 is the direction of six degrees of freedom, the vector V may be a vector of a total of eight dimensions.

The approximate image calculator 122 calculates an approximate image by moving (translating and rotating) the first image by a very small amount of movement ΔV. Here, the amount of movement ΔV is a very small amount of movement preset as a parameter. The approximate image calculator 122 calculates (approximates) each pixel $I_i(V+\Delta V)$ included in the approximate image corresponding to each pixel $I_i(V)$ included in the first image by the following Eq. (4) and Taylor expansion.

[Math. 4]

$$I_i(V+\Delta V)=I_i(V)+\nabla_i^T(V)\Delta V+\varepsilon \quad (4)$$

In the above Eq. (4), ε of a third term on the right side is a term collectively representing second and subsequent orders in the pixel $I_i(V+\Delta V)$. $\nabla_i(V)$ is a first-order differential value indicating the amount of change in the vector that changes for each degree of freedom of the three-dimensional space spread by the vector V. $\nabla_i(V)$ denotes a vector having the same number of dimensions as the vector V representing the amount of change of a pixel value (for example, a CT value) of the corresponding pixel at the same position i within the room coordinate system in the first image before movement (before approximation) and an approximate image after slight movement. For example, when the movement direction of the patient table 12 is the direction of the six degrees of freedom, the six-dimensional vector $\nabla_i(V)$ corresponding to the pixel $I_i(V)$ at the position i of the center of the room coordinate system in the first image is represented by the following Eq. (5).

[Math. 5]

$$\nabla_i(V) = \begin{Bmatrix} (I_i(V+\Delta V_{\theta_x})-I_i(V))/\Delta\theta_x \\ (I_i(V+\Delta V_{\theta_y})-I_i(V))/\Delta\theta_y \\ (I_i(V+\Delta V_{\theta_z})-I_i(V))/\Delta\theta_z \\ (I_i(V+\Delta V_{t_x})-I_i(V))/\Delta t_x \\ (I_i(V+\Delta V_{t_y})-I_i(V))/\Delta t_y \\ (I_i(V+\Delta V_{t_z})-I_i(V))/\Delta t_z \end{Bmatrix} \quad (5)$$

In the above Eq. (5), $\Delta\theta_x$, $\Delta\theta_y$, and $\Delta\theta_z$ denote rotation angles around the axes when three axes in the room coordinate system are an x-axis, a y-axis, and a z-axis and $\Delta t_x$, $\Delta t_y$, and $\Delta t_z$ denote amounts of translational movement along the axes. Each element on the right side of the above Eq. (5) represents a pixel value at the position i in the room coordinate system of the first image. For example, the first element "Eq. (6)" on the right side of the above Eq. (5) denotes a pixel value when the pixel $I_i(V)$ at the position i in the room coordinate system of the first image rotates around the x-axis by the rotation angle $\Delta\theta_x$. In this case, Eq. (7) is represented by the following Eq. (8). Because other elements on the right side of the above Eq. (5) can be represented in the similar way, a detailed description of each element will be omitted.

[Math. 6]

$$I_i(V+\Delta V\theta_x) \quad (6)$$

[Math. 7]

$$\Delta V\theta_x \quad (7)$$

[Math. 8]

$$\Delta V\theta_x = (\Delta\theta_x,0,0,0,0,0)^T \quad (8)$$

The approximate image calculator 122 outputs an approximate image that has been calculated to move (translate and rotate) the first image by a very small amount of movement ΔV as described above to the registrator 124. When the registrator 124 has output information indicating that there is deviation between the first image and the second image, the approximate image calculator 122 similarly calculates a new approximate image obtained by further moving (translating and rotating) the first image by a very small amount of movement ΔV and outputs the calculated new approximate image to the registrator 124.

Next, a calculation method in which the registrator 124 provided in the movement amount calculator 120 calculates amounts of deviation in the position and orientation between the first image and the second image in the movement amount calculation process of the medical image processing device 100 will be described.

Here, assuming that each of the amounts of deviation in the position and orientation between the first image and the second image desired to be obtained by the registrator 124 is the amount of movement ΔV, this amount of deviation can be obtained using the following Eq. (9). The following Eq. (9) is an example of an equation for obtaining the amount of deviation (the amount of movement ΔV) on the basis of a concept (an algorithm) of an optimization method for a Lucas-Kanade method (an LK method).

[Math. 9]

$$\Delta V = \arg\min_{\Delta V} E(\Delta V, \Omega) \quad (9)$$

In the above Eq. (9), Ω is a set containing all positions i of pixels $I_i(V)$ included in a region where the first image and the second image overlap in the room coordinate system. The set Ω may be a set of positions representing a clinically meaningful spatial region such as PTV, GTV, or OAR designated by the planner (the doctor or the like) in the treatment plan when the tumor region is irradiated with the treatment beam B. Also, the set Ω may be a set of positions representing a space (sphere, cube, or rectangular parallelepiped) region of a prescribed size centered on the beam irradiation position in the room coordinate system. The prescribed size is set on the basis of the size of the patient P or an average size of the human body. Alternatively, the set Ω may be a range of PTV or GTV expanded on a given scale.

The registrator 124 compares the first image and the second image using a cost function E(ΔV, Ω) on the right side of the above Eq. (9). The cost function E(ΔV, Ω) is represented by the following Eq. (10).

[Math. 10]

$$E(\Delta V,\Omega)=\Sigma_{i\in\Omega}[I_i(V+\Delta V)-T_i(V)]^2 \quad (10)$$

In the above Eq. (10), $T_i(V)$ denotes a pixel value (for example, a CT value) of each pixel included in the second image of the vector V at the position i in the room coordinate system.

The cost function E(ΔV, Ω) used by the registrator 124 to compare the first image and the second image may be a cost function set in two unconnected spaces as represented by the following Eq. (11).

[Math. 11]

$$E(\Delta V, \Omega) = \lambda E(\Delta V, \Omega_1) + (1-\lambda) E(\Delta V, \Omega_2) \tag{11}$$

The cost function E(ΔV, Ω) used by the registrator 124 to compare the first image and the second image may be a cost function represented as shown in the following Eq. (13) using Eq. (12) of a function for designating a weight corresponding to the position i in the room coordinate system.

[Math. 12]

$$w(i), i \in R^3 \tag{12}$$

[Math. 13]

$$E(\Delta V, \Omega) = \Sigma_{i \in \Omega}[w(i)(I_i(V+\Delta V) - T_i(V))]^2 \tag{13}$$

In Eq. (12) of the function, w(i) is a function for returning a value corresponding to the position i and the path of the radiated treatment beam B as a return value. The function w(i) is, for example, a function for returning binary values such as "1" when the position i is the position on the path through which the treatment beam B passes and "0" when the position i is not the position on the path through which the treatment beam B passes. The function w(i) may be, for example, a function whose return value increases as the distance between the position i and the path through which the treatment beam B passes decreases.

The function w(i) may be, for example, a function for returning a value corresponding to the position i and a set of positions representing a clinically meaningful spatial region such as PTV, GTV, or OAR designated by the planner (the doctor or the like) in the treatment plan when the tumor region is irradiated with the treatment beam B as a return value. The function w(i) may be, for example, a function for returning binary values such as "1" when the position i is a set of positions representing a spatial region and "0" when the position i is not a set of positions representing a spatial region. The function w(i) may be, for example, a function whose return value increases as the distance between the position i and the spatial region decreases.

The above Eq. (9) can be rewritten as the following Eq. (14) on the basis of the approximate image output by the approximate image calculator 122.

[Math. 14]

$$\Delta V = \arg\min_{\Delta V} \sum_{i \in \Omega} [I_i(V) + \nabla_i^T(V)\Delta V - T_i(V)]^2 \tag{14}$$

In the above Eq. (14), ε of the third term on the right side of the above Eq. (4) representing the pixel $I_i(V+\Delta V)$ of the approximate image output by the approximate image calculator 122 is ignored. This is because ε, which is a sum of the second and subsequent orders in the above Eq. (4), is a very small value and there is no large influence on a subsequent process even if ε is ignored.

For the right side of the above Eq. (14), if the right side is differentiated by the amount of movement ΔV and set to 0 so that the minimum value of the amount of movement ΔV is obtained, the amount of movement ΔV is represented by the following Eq. (15).

[Math. 15]

$$\Delta V = H^{-1}\Sigma_{i \in \Omega}[\nabla_i(V)(T_i(V) - I_i(V))] \tag{15}$$

Here, H on the right side of the above Eq. (15) is represented by the following Eq. (16).

[Math. 16]

$$H = \Sigma_{i \in \Omega} \nabla_i(V) \nabla_i^T(V) \tag{16}$$

The registrator 124 updates the position and orientation vector V of the first image using the amount of movement ΔV obtained by the above Eq. (15) as shown by the following Eq. (17).

[Math. 17]

$$V_1 \leftarrow V_1 + \Delta V \tag{17}$$

In the above Eq. (17), the updated position and orientation vector V of the first image is set as a vector $V_1$.

The registrator 124 iterates the calculation of the amount of movement ΔV based on the above Eq. (15) until the change in the vector $V_1$ of the updated first image decreases. Until the change in the vector $V_1$ decreases, the norm of the amount of movement ΔV, i.e., each of the amounts of deviation in the position and orientation between the first image and the second image, becomes less than or equal to a prescribed threshold value. In other words, the body posture of the patient P shown in the second image is determined to be aligned with the body posture of the patient P in the treatment planning phase shown in the first image. The norm of the amount of movement ΔV may be the norm of the vector, and for example, l0 norm, l1 norm, or l2 norm, is used.

When the set Ω is a PTV or GTV region as described above, the elements of the set Ω also need to be updated if the position and orientation of the first image are updated. That is, the set Ω is a set of coordinate positions in the room coordinate system and the positions change as the first image moves in the room coordinate system. To avoid the need for such updates, the first image in which the position and the orientation are updated preferably does not include a region defining the set Ω. For example, a CT image captured immediately before treatment (a current second image) may be set as the first image and a CT image including treatment plan information (a current first image) may be replaced with the second image.

The number of iterations of calculation of the amount of movement ΔV in the registrator 124 may exceed the preset number of calculation iterations. In this case, a period of time required for the registrator 124 to calculate the amount of movement ΔV can be shortened. However, in this case, although the registrator 124 terminates the calculation of the amount of movement ΔV when the number of calculation iterations exceeds the preset number of calculation iterations, the norm of the amount of movement ΔV is not necessarily less than or equal to a prescribed threshold value. In other words, it is also conceivable that there is a high possibility that the calculation of position alignment of the patient P has failed. In this case, the registrator 124 may be configured to output a warning signal indicating that the calculation of the amount of movement ΔV has ended due to the number of calculation iterations exceeding the preset number of calculation iterations to, for example, a warning unit (not shown) provided in the medical image processing device 100 or the treatment system 1. Thereby, the warning unit (not shown) can notify a radiation treatment practitioner such as a doctor, i.e., a user of the treatment system 1, that there is a possibility that the calculation of the position alignment of the patient P has failed.

The registrator 124 calculates the amount of movement ΔV calculated as described above, i.e., the amounts of deviations in the position and orientation between the first image and the second image, for each degree of freedom in the above Eq. (5). The registrator 124 determines the amount of movement (the amount of translation and the amount of rotation) of the patient table 12 on the basis of the calculated amounts of deviation for each degree of freedom. At this time, the registrator 124 obtains a total amount of movement ΔV after movement for each degree of freedom, for example, when the approximate image is calculated from the first image. The registrator 124 determines the amount of movement of the patient table 12 on which the current position of the patient P is moved by the total amount of movement for each degree of freedom. The registrator 124 outputs a movement amount signal SM indicating the determined amount of movement of the patient table 12 to the patient table controller 14.

According to this process, in the movement amount calculation process of the medical image processing device 100, the approximate image calculator 122 calculates the approximate image from the first image and the registrator 124 calculates the amount of deviation between the body posture of the patient P in the treatment planning phase and the current body posture of the patient P on the basis of the approximate image and the second image. In other words, in the movement amount calculation process of the medical image processing device 100, the deviation in the irradiation direction (path) of the treatment beam B is determined on the basis of the approximate image and the second image. In the movement amount calculation process of the medical image processing device 100, the calculation of the approximate image and the calculation of the amount of deviation are iterated. In the movement amount calculation process of the medical image processing device 100, when the calculated amount of deviation between the approximate image and the second image becomes less than or equal to a prescribed threshold value, the amount of movement for moving the patient table 12 is determined so that the current body posture of the patient P is aligned with the body posture of the patient P in the treatment planning phase on the basis of a currently calculated total amount of deviation and the movement amount signal SM indicating the determined amount of movement of the patient table 12 is output to the patient table controller 14. In other words, in the movement amount calculation process of the medical image processing device 100, the movement amount signal SM is output to the patient table controller 14 by deciding the amount of movement of the patient table 12 for aligning the current body posture of the patient P with the body posture of the patient P in the treatment planning phase so that the treatment beams B of the amount of energy close to energy planned in the treatment planning phase can be radiated to the tumor inside of the body of the patient P. Thereby, the treatment system 1 including the medical image processing device 100 can radiate the treatment beam B of the amount of energy planned in the treatment planning phase to the tumor and perform the radiation treatment as planned by actually moving the patient P in accordance with the amount of movement of the patient table 12 determined in the movement amount calculation process of the medical image processing device 100.

As described above, in the movement amount calculation process of the medical image processing device 100, the approximate image calculator 122 calculates an approximate image by moving (translating and rotating) the first image by a very small amount of movement ΔV on the basis of a vector corresponding to a degree of freedom to which the patient table controller 14 can control a movement direction of the patient table 12 (see the above Eq. (5)). In the movement amount calculation process of the medical image processing device 100, the registrator 124 calculates amounts of deviation in the position and orientation between the approximate image and the second image. Thus, in the medical image processing device 100, the position alignment of the patient P in the image collation process between three-dimensional CT images can be performed at a speed higher than that when the position alignment of the patient P is performed using the first image and the second image as they are as in the related art. Moreover, the approximate image for use in the collation process in the medical image processing device 100 is obtained by moving the first image by a very small amount of movement ΔV and the accuracy of the position alignment of the patient P is high according to the amount of movement ΔV.

In the movement amount calculation process of the medical image processing device 100, when the calculation of the approximate image and the calculation of the amount of deviation are iterated, a new approximate image is calculated by moving (translating and rotating) the first image. In other words, in the movement amount calculation process of the medical image processing device 100, the approximate image is recreated by repeating the calculation of the approximate image and the amount of deviation. Thus, in the medical image processing device 100 or the treatment system 1 having the medical image processing device 100, when the image size of an original image (here, the first image) for calculating the approximate image is made smaller than the size of a reference image (here, the second image) for calculating the amount of deviation, it is possible to reduce the load of calculation of the approximate image to be iterated, i.e., to shorten a time period for calculating the approximate image.

As described above, in the medical image processing device 100, the first image acquirer 102 acquires the first image of the patient P captured before treatment and the parameters indicating the position and orientation when the first image has been captured and the second image acquirer 104 acquires the second image of the patient P captured immediately before treatment starts and the parameters indicating the position and orientation when the second image has been captured. In the medical image processing device 100, the direction acquirer 106 acquires information about the direction within the treatment room. In the medical image processing device 100, the approximate image calculator 122 provided in the movement amount calculator 120 calculates an approximate image by converting (approximating) the first image on the basis of the first image, the parameters indicating the position and orientation of the first image, and the direction information. Furthermore, in the medical image processing device 100, the registrator 124 provided in the movement amount calculator 120 calculates amounts of deviation in the position and orientation between the first image and the second image on the basis of the approximate image, the second image, and the parameters indicating the position and orientation of the second image. In the medical image processing device 100, when it is determined that the calculated amount of deviation is suitable for the current body posture of the patient P shown in the second image and the body posture of the patient P in the treatment planning phase shown in the first image, the registrator 124 determines the amount of movement of the patient table 12, i.e., the final amount of movement of the patient P, on the basis of the calculated amount of deviation, and outputs the movement amount signal SM indicating the determined amount of movement of the patient table 12 to the patient table controller 14. Thereby, in the treatment system 1 including the medical image processing device 100, the patient table controller 14 causes the patient table 12 to move on the basis of the movement amount signal SM, so that the position of the patient P is actually moved. Thereby, the treatment system 1 including the medical image processing device 100 can perform radiation treatment as planned by adjusting the current position of the patient P to a state in which the treatment beam B of the amount of energy close to energy determined in the treatment planning phase can be radiated to the tumor inside of the body of the patient P.

As described above, the medical image processing device 100 includes the first image acquirer 102 configured to acquire a three-dimensional first image obtained by photographing the inside of a body of the patient P; the second image acquirer 104 configured to acquire a three-dimensional second image of the inside of the body of the patient P imaged at a timing different from that of the first image; the direction acquirer 106 configured to acquire direction information about an irradiation direction of a treatment beam B to the patient P in a treatment room; and the movement amount calculator 120 configured to output the movement amount signal SM indicating the amount of movement of the second image to be moved to align the position of the patient P shown in the second image with the position of the patient P shown in the first image on the basis of the path of the treatment beam B set in the first image and the direction information about the irradiation direction. Thereby, the medical image processing device 100 can calculate the amount of deviation between the body posture of the patient P in the treatment planning phase and the current body posture of the patient P on the basis of the first image acquired by the first image acquirer 102, the second image acquired by the second image acquirer 104, and the direction information acquired by the direction acquirer 106 and can determine the amount of movement for aligning the current position of patient P with the position when the first image has been captured in the treatment planning phase.

As described above, the movement amount calculator 120 may include the approximate image calculator 122 configured to calculate an approximate image generated (converted (approximated)) by shifting the first image by a prescribed width (for example, a very small amount of movement) for each degree of freedom to which a body posture of the patient P changes on the basis of the path of the treatment beam B and the direction information about the irradiation direction; and the registrator 124 configured to calculate the amount of deviation between the first image and the second image using the approximate image, determine the amount of movement on the basis of the calculated amount of deviation, and output the movement amount signal SM indicating the determined amount of movement. As described above, the movement amount calculator 120 may include the approximate image calculator 122 configured to calculate a two-dimensional approximate image obtained by mapping the first image onto a plane on the basis of the path of the treatment beam B and direction information about the irradiation direction; and the registrator 124 configured to calculate the amount of deviation between the first image and the second image using the approximate image, determine the amount of movement on the basis of the calculated amount of deviation, and output the movement amount signal SM indicating the determined amount of movement. Thereby, the medical image processing device 100 can calculate an approximate image by approximating the first image, calculate amounts of deviation in the position and orientation between the approximate image (in other words, the first image) and the second image, determine the amount of movement of the patient table 12 for aligning the current body posture of the patient P shown in the second image with the body posture of the patient P in the treatment planning phase shown in the first image on the basis of the calculated amounts of deviation, and output the movement amount signal SM indicating the determined amount of movement of the patient table 12.

Second Embodiment

A second embodiment will be described below. In the first embodiment, the calculation method of calculating the amount of movement of the patient table 12 so that each of the first image and the second image is virtually arranged within a prescribed three-dimensional space (the room coordinate system) and a difference between pixel values at a spatially identical position i in the first and second images is reduced has been described. However, although the pixel value difference between the first image and the second image is small in this calculation method, the calculation is not necessarily performed so that a dose distribution of the treatment beam B for the tumor designated by the planner (the doctor or the like) in the treatment plan important in radiation treatment is identical. Because energy in radiation (here, the treatment beam B) is lost when the radiation passes through a substance, a radiation irradiation method is defined by calculating the amount of energy loss of radiation virtually radiated using a CT image in the treatment plan. If this is taken into account, it is important that the tissues in the patient's body located on the path through which the treatment beam B to be radiated passes match when the position of the patient P is aligned in the treatment phase. Therefore, in the second embodiment, a configuration and a calculation method for deciding the amount of movement of the patient table 12 for aligning the current body posture of the patient P with the body posture of the patient P in the treatment planning phase so that the energy given to the tumor inside of the body of the patient P by the radiated treatment beam B is closer to energy planned in the treatment planning phase are proposed.

The configuration of the treatment system including the medical image processing device of the second embodiment is a configuration in which the medical image processing device 100 is replaced with the medical image processing device 200 of the second embodiment in the configuration of the treatment system 1 including the medical image processing device 100 of the first embodiment shown in FIG. 1. In the following description, the treatment system including the medical image processing device 200 will be referred to as a "treatment system 2."

In the following description, in the components of the treatment system 2 including the medical image processing device 200, components similar to those of the treatment system 1 including the medical image processing device 100 of the first embodiment are denoted by the same reference signs, detailed description of the components will be omitted, and differences will be mainly described.

As in the medical image processing device 100 of the first embodiment, the medical image processing device 200 performs a process of aligning the position of the patient P when radiation treatment is performed on the basis of a CT image output by the CT photography device 16 and outputs a movement amount signal SM for moving the patient table 12 to the patient table controller 14 so that the irradiation direction of the treatment beam B radiated from the treatment beam irradiation gate 18 is aligned with the direction set in the treatment planning phase. The medical image processing device 200 can determine the amount of movement of the patient table 12 so that energy applied to the tumor inside of the body of the patient P by the radiated treatment beam B is close to energy planned in the treatment planning phase as compared with the medical image processing device 100 of the first embodiment.

Figure 4:
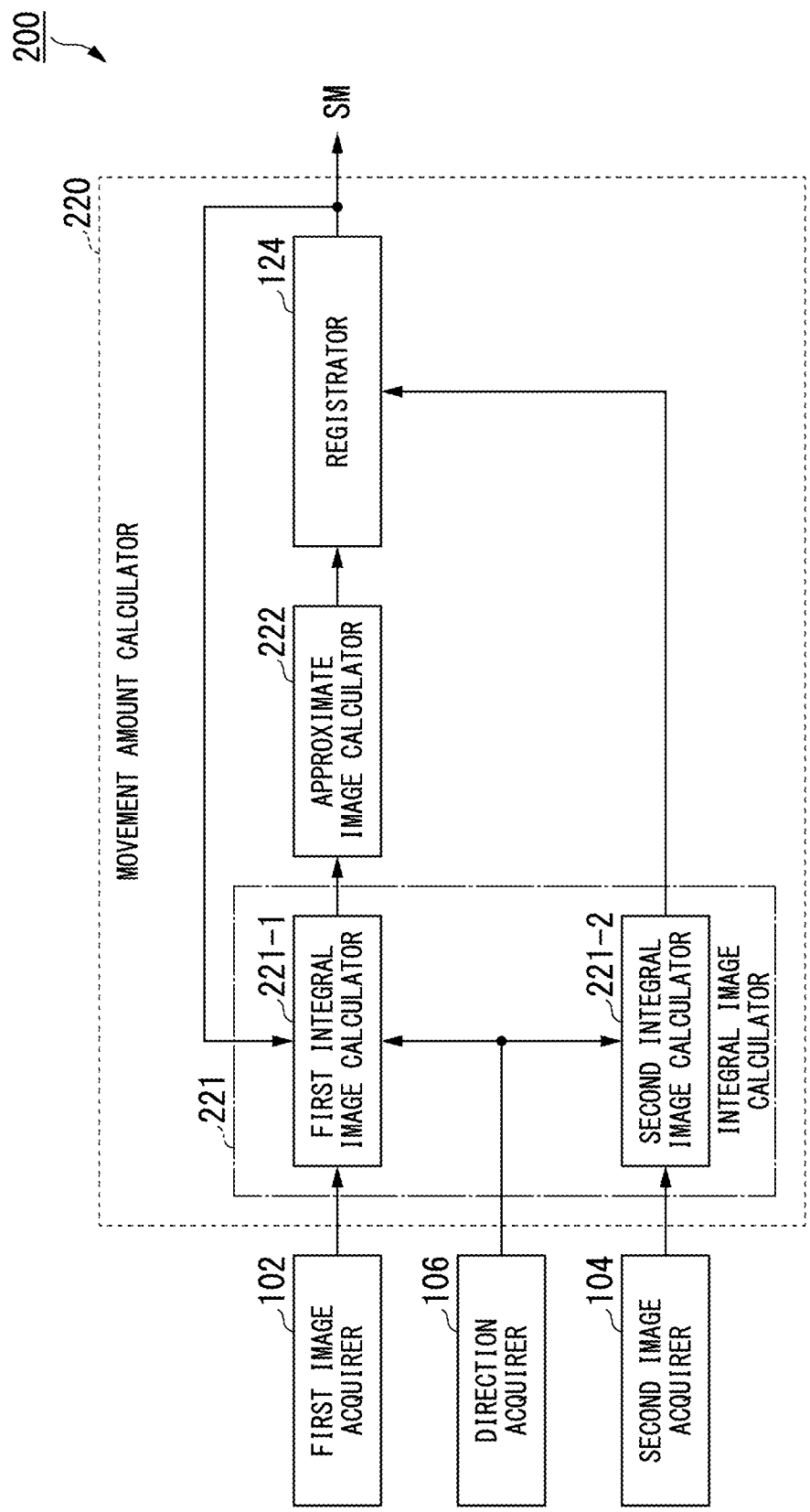
FIG. 4 is a block diagram showing a schematic configuration of a medical image processing device of a second embodiment.

The configuration of the medical image processing device 200 that configures the treatment system 2 will be described below. FIG. 4 is a block diagram showing a schematic configuration of the medical image processing device 200 according to the second embodiment. The medical image processing device 200 includes, for example, a first image acquirer 102, a second image acquirer 104, a direction acquirer 106, and a movement amount calculator 220. The movement amount calculator 220 includes, for example, an integral image calculator 221, an approximate image calculator 222, and a registrator 124. The integral image calculator 221 includes, for example, a first integral image calculator 221-1 and a second integral image calculator 221-2.

The integral image calculator 221 calculates an integral image corresponding to the first image output by the first image acquirer 102 (hereinafter referred to as "first integral image") and an integral image corresponding to the second image output by the second image acquirer 104 (hereinafter referred to as a "second integral image"). The integral image calculator 221 outputs the first integral image to the approximate image calculator 222 and outputs the second integral image to the registrator 124. An integral image is an image obtained by integrating pixel values along the irradiation path of the treatment beam B within the image.

The first integral image calculator 221-1 calculates the first integral image by integrating pixel values (CT values) of pixels (voxels) located on the path through which the treatment beam B passes within the first image on the basis of the first image and the parameters indicating the position and orientation of the first image output by the first image acquirer 102 and the direction information output by the direction acquirer 106. The first integral image calculator 221-1 outputs the calculated first integral image to the approximate image calculator 222. At this time, the first integral image calculator 221-1 may also output the parameters indicating the position and orientation of the first image to the approximate image calculator 222 together with the first integral image.

The second integral image calculator 221-2 calculates the second integral image by integrating pixel values (CT values) of pixels (voxels) located on the path through which the treatment beam B passes within the second image on the basis of the second image and the parameters indicating the position and orientation of the second image output by the second image acquirer 104 and the direction information output by the direction acquirer 106. The second integral image calculator 221-2 outputs the calculated second integral image to the registrator 124. At this time, the second integral image calculator 221-2 may also output parameters indicating the position and orientation of the second image to registrator 124 together with the second integral image.

The approximate image calculator 222 calculates an approximate image by converting (approximating) the first image on the basis of the first integral image output by the first integral image calculator 221-1 provided in the integral image calculator 221. The approximate image calculator 222 outputs the calculated approximate image to the registrator 124. The approximate image calculation method in the approximate image calculator 222 can be considered similar to the approximate image calculation method in the approximate image calculator 122 provided in the movement amount calculator 120 within the medical image processing device 100 of the first embodiment.

Here, the outline of a method in which the integral image calculator 221 calculates the integral images will be described using the first integral image calculator 221-1 that calculates the first integral image corresponding to the first image as an example. In the calculation of the first integral image by the first integral image calculator 221-1, first, pixels located on the path through which the treatment beam B passes are extracted from among the pixels included in the first image output by the first image acquirer 102. In relation to the path through which the treatment beam B passes, the path along which the treatment beam B radiated from the treatment beam irradiation gate 18 passes through the patient P can be obtained as three-dimensional coordinates of the room coordinate system on the basis of the irradiation direction of the treatment beam B included in the direction information output by the direction acquirer 106. The path through which the treatment beam B passes may be obtained as a three-dimensional vector starting from the position of the treatment beam irradiation gate 18 represented by three-dimensional coordinates in the room coordinate system.

Figure 5:
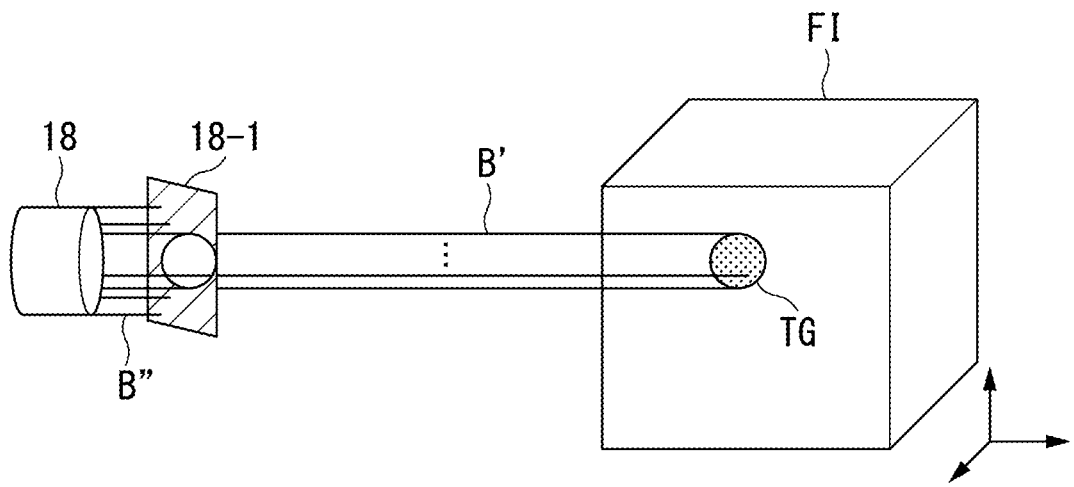
FIG. 5 is a diagram showing an example of a relationship between the output of radiation and a radiation irradiation target in a treatment system including the medical image processing device of the second embodiment.

The irradiation direction of the treatment beam B radiated from the treatment beam irradiation gate 18 will be described below. In the following discussion, it is assumed that the path of treatment beam B is a three-dimensional vector. FIG. 5 is a diagram showing an example of the relationship between the output of radiation (the treatment beam B) in the treatment system 2 having the medical image processing device 200 of the second embodiment and an irradiation target TG (the tumor located inside of the body of the patient P) of the radiation (the treatment beam B). In FIG. 5, an example of the path until the treatment beam B radiated from the treatment beam irradiation gate 18 reaches the region (range) of the tumor located inside of the body of the patient P who is the irradiation target TG is shown. FIG. 5 shows an example of a configuration in which the treatment beam B is radiated from the treatment beam irradiation gate 18.

When the treatment beam irradiation gate 18 is configured to output the treatment beam B, the treatment beam irradiation gate 18 has a planar output aperture as shown in FIG. 5. The treatment beam B radiated from the treatment beam irradiation gate 18 reaches the tumor of the irradiation target TG via a collimator 18-1. That is, only a treatment beam B' having passed through the collimator 18-1 within the treatment beams B output from the treatment beam irradiation gate 18 reaches the tumor of the irradiation target TG. The collimator 18-1 is a metallic instrument for blocking unnecessary treatment beams B". For example, a region through which the treatment beam B passes is adjusted according to the shape of the tumor of the irradiation target TG so that the treatment beam B is not radiated to a region other than the tumor located inside of the body of the patient P. The collimator 18-1 may be, for example, a multi-leaf collimator capable of mechanically changing a region where an unnecessary treatment beam B" is blocked. In FIG. 5, an example in which the treatment beam B' having passed through the collimator 18-1 within the treatment beams B is radiated to the tumor of the irradiation target TG within a first image FI is schematically shown. In this case, the starting point in the path of the treatment beam B' is the position of the output point of the treatment beam B' located within the range of the planar output aperture of the treatment beam irradiation gate 18. The three-dimensional position of the treatment beam irradiation gate 18 is, for example, the position (coordinates) of the center of the plane of the output aperture.

The direction acquirer 106 outputs direction information including the irradiation direction of the treatment beam B' as information indicating the irradiation direction of the treatment beam B to the first integral image calculator 221-1. The first integral image calculator 221-1 sets the path along which the treatment beam B' reaches the tumor of the irradiation target TG within the first image FI as the path of the treatment beam B' radiated within a prescribed three-dimensional space. Here, the tumor position of the irradiation target TG is represented by the position i in the room coordinate system and a path b(i) of the treatment beam B' reaching that position is discretely represented as shown in the following Eq. (18) according to a set of three-dimensional vectors.

[Math. 18]

$$B' = \{b(i) | i \in \Omega\} \tag{18}$$

The starting point of each path, i.e., the starting point of the three-dimensional vector b(i), is the position of the output point of the treatment beam B' reaching the tumor of the irradiation target TG on each path b(i). S denotes the three-dimensional position of this starting point. Also, $\Omega$ denotes the tumor position of the irradiation target TG, i.e., a set of positions in the PTV or GTV room coordinate system, as in the definition of the above Eq. (9) in the first embodiment.

Figure 6:
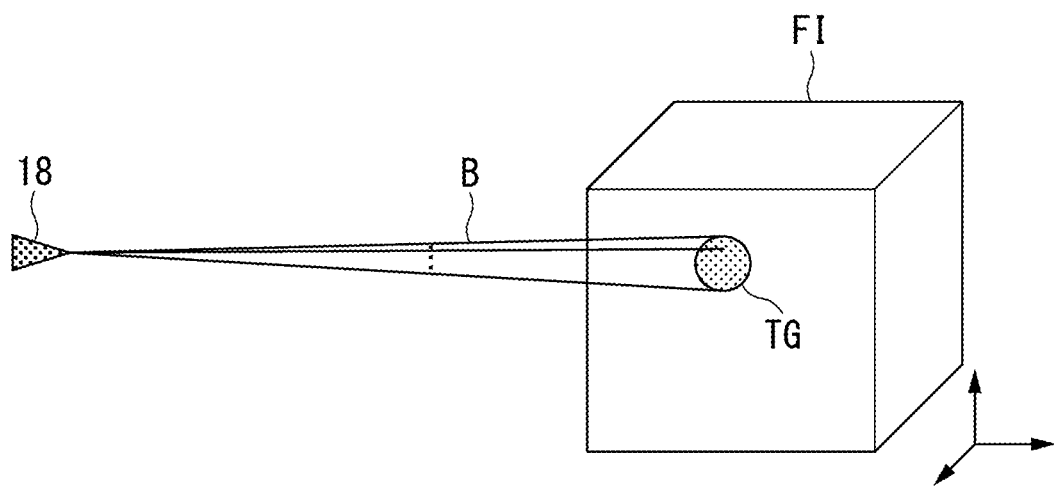
FIG. 6 is a diagram showing another example of a relationship between the output of radiation and a radiation irradiation target in the treatment system including the medical image processing device of the second embodiment.

FIG. 6 is a diagram showing another example of the relationship between the output of radiation (the treatment beam B) in the treatment system 2 having the medical image processing device 200 of the second embodiment and an irradiation target TG (the tumor located inside of the body of the patient P) of the radiation (the treatment beam B). In FIG. 6, an example of the path until the treatment beam B radiated from the treatment beam irradiation gate 18 reaches the region (range) of the tumor located inside of the body of the patient P who is the irradiation target TG is also shown. FIG. 6 shows an example in which the treatment beam irradiation gate 18 is configured to send the radiated treatment beam B in a scan process. In this configuration, the treatment beam irradiation gate 18 does not have a collimator 18-1 and has one output aperture as shown in FIG. 6. The direction of the treatment beam B radiated from one output aperture of the treatment beam irradiation gate 18 is bent by, for example, a magnet, and the treatment beam B is sent in the scan process to cover (scan) the entire region of the tumor of the irradiation target TG and is radiated to the tumor of the irradiation target TG. In FIG. 6, an example in which a scan process is performed in the irradiation direction of the treatment beam B and the tumor of the irradiation target TG within the first image FI is irradiated therewith is schematically shown. In this case, the starting point of each path of the treatment beam B sent in the scan process is the position of the output aperture of the treatment beam irradiation gate 18. The three-dimensional position of the treatment beam irradiation gate 18 is the position (coordinates) of one output aperture. The path b(i) of the treatment beam B reaching a certain position i in the room coordinate system in this case can be discretely represented as shown in the above Eq. (18).

The direction acquirer 106 outputs direction information including the irradiation direction in which the treatment beam B is sent in the scan process as information indicating the irradiation direction of the treatment beam B to the first integral image calculator 221-1. The first integral image calculator 221-1 sets a path b(i) along which the treatment beam B sent in the scan process reaches the coordinates i in the room coordinate system representing the position of the tumor of the irradiation target TG within the first image FI as the path of the treatment beam B radiated within the prescribed three-dimensional space. The path of the treatment beam B in this case can also be represented discretely by a set of three-dimensional vectors, as in the above Eq. (18). The starting point of each path, i.e., the starting point of the three-dimensional vector b(i), is the position of the output aperture of the treatment beam irradiation gate 18.

(Integral Image Generation Method)

Next, a method in which the integral image calculator 221 calculates each integral image will be described. In the following description, the position i of one point in a prescribed three-dimensional space (room coordinate system) is represented as the point i. A pixel value of a three-dimensional pixel corresponding to the point i included in the first image virtually arranged in the prescribed three-dimensional space is represented by $I_i(V)$. Likewise, the pixel value of the three-dimensional pixel corresponding to the point i included in the second image virtually arranged within the prescribed three-dimensional space is denoted by $T_i(V)$. When there is no pixel corresponding to the point i within the first image or the second image, the pixel value is set to "0." V is a parameter of the vector V representing the position and orientation of the first image or the second image within the prescribed three-dimensional space.

The vectors from the three-dimensional vector 0 of the position of the output aperture of the treatment beam irradiation gate 18 in the treatment beam B, i.e., the starting point S, to the vector of the point i, can be represented by the following Eq. (19).

[Math. 19]

$$b(i) = i - S \tag{19}$$

In this case, Eq. (20) for pixel values of pixels included in a first integral image obtained by integrating the pixel values of the pixels located on the path of the treatment beam B to the point i in the first image by the first integral image calculator 221-1 (hereinafter referred to as "integral pixel values") can be calculated by the following Eq. (21).

[Math. 20]

$$\tilde{I}_i(V) \tag{20}$$

[Math. 21]

$$\tilde{I}_i(V) = \int_0^1 f(I_{i-tb(i)}(V))dt \tag{21}$$

Likewise, in the second integral image calculator 221-2, Eq. (22) for integral pixel values of pixels included in a second integral image obtained by integrating pixel values of the pixels located on the path of the treatment beam B to the point i in the second image can be calculated by the following Eq. (23).

[Math. 22]

$$\tilde{T}_i(V) \quad (22)$$

[Math. 23]

$$\tilde{T}_i(V) = \int_0^1 f(T_{i-tb(i)}(V))dt \quad (23)$$

In the above Eqs. (21) and (23), t denotes a parameter and f(x) denotes a function for converting a pixel value (a CT value) of the CT image. The function f(x) is, for example, a function according to a conversion table for converting the amount of radiation energy loss into a water-equivalent thickness. As described above, energy in the radiation is lost when the radiation passes through a substance. At this time, the amount of energy lost in the radiation is the amount of energy corresponding to the CT value of the CT image. In other words, the amount of radiation energy loss is not uniform and differs according to the tissues inside of the body of the patient P, for example, such as bones and fat. The water-equivalent thickness is a value indicating the amount of radiation energy loss, which differs for each tissue (substance), as a thickness of water, which is the same substance, and can be converted on the basis of the CT value. For example, when the CT value is a value indicating bone, the water-equivalent thickness has a large value because the amount of energy loss when radiation passes through the bone is large. For example, when the CT value is a value indicating fat, the water-equivalent thickness has a small value because the amount of energy loss when radiation passes through fat is small. For example, when the CT value is a value indicating air, the water-equivalent thickness is "0" because there is no energy loss when the radiation passes through the air. By converting each CT value contained in the CT image into a water-equivalent thickness, the amount of energy loss due to each pixel located on the path of the treatment beam B can be represented by the same standard. As a conversion formula for converting a CT value into a water-equivalent thickness, for example, a regression formula based on experimentally obtained nonlinear conversion data is used. Various publications have been published in relation to experimentally obtained nonlinear conversion data. The function f(x) may be, for example, a function for identity mapping.

The first integral image calculator 221-1 outputs the first integral image based on Eq. (20) for the integral pixel values corresponding to the first image to the registrator 124. The second integral image calculator 221-2 outputs the second integral image based on Eq. (22) for the integral pixel values corresponding to the second image to the registrator 124.

Thereby, the registrator 124 calculates the amount of movement ΔV including amounts of deviation in the position and orientation between the first image and the second image using the cost function E(ΔV, Ω) represented by the following Eq. (24) based on a concept similar to that of the above Eq. (10) shown in the first embodiment.

[Math. 24]

$$E(\Delta V, \Omega) = \sum_{i \in \Omega} [\tilde{T}_i(V + \Delta V) - \tilde{T}_i(V)]^2 \quad (24)$$

Subsequently, the registrator 124 determines the amount of movement (the amount of translation and the amount of rotation) of the patient table 12 on the basis of the amount of movement ΔV calculated using the cost function E(ΔV, Ω) of the above Eq. (24) and outputs a movement amount signal SM indicating the determined amount of movement of the patient table 12 to the patient table controller 14.

In the movement amount calculation process of the medical image processing device 200, it is only necessary to add a process of the integral image calculator 221 to the movement amount calculation process of the medical image processing device 100 of the first embodiment shown in FIG. 3. More specifically, in the movement amount calculation process of the medical image processing device 100 of the first embodiment shown in FIG. 3, it is only necessary to add a process in which the integral image calculator 221 calculates each integral image before step S104. Accordingly, a detailed description of the flow of the movement amount calculation process of the medical image processing device 200 will be omitted.

According to this configuration and operation, the medical image processing device 200 calculates the first integral image from the first image and calculates the second integral image from the second image in the movement amount calculation process. Subsequently, in the medical image processing device 200, as in the medical image processing device 100 of the first embodiment, the approximate image calculator 222 calculates an approximate image from the first integral image and the registrator 124 calculates deviation in the irradiation direction (the path) of the treatment beam B, i.e., the amount of deviation between the body posture of the patient P of the treatment planning phase and the current body posture of the patient P, on the basis of the approximate image and the second integral image. In the movement amount calculation process of the medical image processing device 200, as in the movement amount calculation process of the medical image processing device 100 of the first embodiment, the calculation of the approximate image and the calculation of the amount of deviation are iterated, the amount of movement for moving the patient table 12 is determined on the basis of the amount of deviation when the amount of deviation between the approximate image and the second integral image is less than or equal to a prescribed threshold value, and a movement amount signal SM indicating the determined amount of movement of the patient table 12 is output to the patient table controller 14. Thereby, even in the treatment system 2 including the medical image processing device 200, as in the treatment system 1 including the medical image processing device 100 of the first embodiment, it is possible to radiate the treatment beam B having the energy amount planned in the treatment plan to the tumor by actually moving the patient P in accordance with the amount of movement of the patient table 12 determined in the movement amount calculation process of the medical image processing device 200 and to perform radiation treatment as planned.

Moreover, in the medical image processing device 200, the integral image calculator 221 calculates the first integral image corresponding to the first image and the second integral image corresponding to the second image according to prescribed nonlinear conversion (experimentally obtained nonlinear conversion data). Thereby, the medical image processing device 200 can determine the amount of movement of the patient table 12 by matching the dose distribution of the treatment beam B for the tumor of concern in the medical image processing device 100 of the first embodiment. In other words, the medical image processing device 200 can determine the amount of movement of the patient table 12 in a state in which the tissues inside of the body of the patient P located on the path through which the treatment beam B radiated to the tumor important in the radiation treatment passes are matched.

However, in the medical image processing device 200, the approximate image for calculating the amount of deviation in the movement amount calculation process is based on the first integral image. Thus, when the registrator 124 calculates the approximate image and the amount of deviation (i.e., calculates the amount of movement $\Delta V$) and updates a vector V1 of the first integral image, it is necessary for the first integral image calculator 221-1 to calculate (recreate) a new first integral image when a new approximate image is calculated (recreated). That is, it is necessary for the first integral image calculator 221-1 to recalculate a first integral image obtained by integrating pixel values (CT values) of pixels (voxels) located on a new path through which the treatment beam B passes within the first image. For example, when the movement direction of the patient table 12 is the direction of six degrees of freedom, it is only necessary for the first integral image calculator 221-1 to newly calculate the first integral image of the six paths corresponding to degrees of freedom in six-dimensional vector $\nabla_t(V)$ represented by the above Eq. (5). That is, the first integral image calculator 221-1 performs the recalculation of the first integral image six times. The recalculation of the first integral image in the first integral image calculator 221-1 is considered to be a factor that increases the calculation time. Thus, in the medical image processing device 200, after the position alignment of the patient P is performed by calculating the amount of deviation using the cost function $E(\Delta V, \Omega)$ shown in the above Eq. (10), the above Eq. (11), or the above Eq. (13) in the first embodiment, the position alignment of the patient P may be further performed by calculating the amount of deviation using the cost function $E(\Delta V, \Omega)$ shown in the above Eq. (24). Thereby, the medical image processing device 200 can reduce the number of times the first integral image needs to be recalculated when the calculation of the approximate image and the calculation of the amount of deviation are iterated in the movement amount calculation process and shorten the overall calculation time required for the movement amount calculation process.

As described above, in the medical image processing device 200, as in the medical image processing device 100 of the first embodiment, the first image acquirer 102 acquires the first image of the patient P captured before treatment and the parameters indicating the position and orientation when the first image has been captured and the second image acquirer 104 acquires the second image of the patient P captured immediately before the start of treatment and the parameters indicating the position and orientation when the second image has been captured. Furthermore, even in the medical image processing device 200, the direction acquirer 106 acquires information about the direction within the treatment room. In the medical image processing device 200, the integral image calculator 221 provided in the movement amount calculator 220 calculates integral images corresponding to the first image and the second image and the approximate image calculator 222 calculates an approximate image by converting (approximating) the first image on the basis of the first integral image. Subsequently, even in the medical image processing device 200, as in the medical image processing device 100 of the first embodiment, the registrator 124 calculates amounts of deviation in the position and orientation between the first image and the second image on the basis of the approximate image and the second integral image corresponding to the second image, determines the amount of movement of the patient table 12, i.e., the final amount of movement of the patient P, on the basis of the calculated amounts of deviation, and outputs a movement amount signal SM indicating the determined amount of movement of the patient table 12 to the patient table controller 14. Thereby, even in the treatment system 2 including the medical image processing device 200, as in the treatment system 1 including the medical image processing device 100 of the first embodiment, the patient table controller 14 causes the patient table 12 to move on the basis of the movement amount signal SM, so that the position of the patient P is actually moved. Thereby, even in the treatment system 2 including the medical image processing device 200, as in the treatment system 1 including the medical image processing device 100 of the first embodiment, it is possible to perform radiation treatment as planned by aligning the current position of the patient P in a state in which the treatment beams B corresponding to the amount of energy close to the energy determined in the treatment planning phase can be radiated to the tumor inside of the body of the patient P. Moreover, because the treatment system 2 including the medical image processing device 200 can determine the amount of movement of the patient table 12 in a state in which the tissues inside of the body of the patient P located on the path through which the treatment beam B radiated to the tumor passes are matched, it is possible to perform radiation treatment by radiating the treatment beams B corresponding to the amount of energy closer to the energy determined in the treatment planning phase to the tumor inside of the body of the patient P as compared with the treatment system 1 including the medical image processing device 100 of the first embodiment.

As described above, in the medical image processing device 200, the movement amount calculator 220 further includes the integral image calculator 221 configured to calculate a first integral image obtained by integrating pixel values (CT values) of three-dimensional first pixels (voxels) included in the first image and through which the treatment beam B passes along the path of the treatment beam B and calculate a second integral image obtained by integrating pixel values (CT values) of three-dimensional second pixels (voxels) included in the second image and through which the treatment beam B radiated from the irradiation direction passes, the approximate image calculator 222 calculates the approximate image on the basis of the first integral image, and the registrator 124 outputs the movement amount signal SM based on the amount of deviation between the second integral image and the approximate image. Thereby, the medical image processing device 200 can calculate the amount of deviation between the body posture of the patient P in the treatment planning phase and the current body posture of the patient P on the basis of the first integral image obtained by integrating the CT values of the voxels included in the first image and the first integral image obtained by integrating the CT values of the voxels included in the second image and determine the amount of movement for aligning the current position of the patient P with the position when the first image has been captured in the treatment planning phase.

As described above, the integral image calculator 221 may calculate the first integral image and the second integral image by performing an integral process after converting the pixel values (the CT values) of the first pixels (voxels) located on the path of the treatment beam B and the pixel values (the CT values) of the second pixels (voxels) located on the path through which the treatment beam B radiated from the irradiation direction passes using prescribed non-linear conversion (experimentally obtained non-linear conversion data). Thereby, the medical image processing device 200 can determine the amount of movement for aligning the current position of the patient P with the position when the first image has been captured in the treatment planning phase on the basis of the first integral image and the second integral image obtained by performing the integral process after the CT values of the voxels included in the first image and the CT values of the voxels included in the second image are converted according to a regression formula based on the experimentally obtained nonlinear conversion data.

As described above, the integral image calculator 221 may convert each of the pixel values (the CT values) of the first pixels (voxels) located on the path of the treatment beam B and the pixel values (the CT values) of the second pixels (voxels) located on the path through which the treatment beam B radiated from the irradiation direction passes into a value (for example, a water-equivalent thickness) indicating arrival energy for the treatment beam B to arrive at each pixel (voxel) using the non-linear conversion (experimentally obtained nonlinear conversion data). Thereby, the medical image processing device 200 can determine the amount of movement for aligning the current position of the patient P with the position when the first image has been captured in the treatment planning phase on the basis of the first integral image and the second integral image obtained by performing an integral process after the CT values of the voxels included in the first image and the CT values of the voxels included in the second image are converted into, for example, water-equivalent thicknesses.

As described above, the integral image calculator 221 may calculate each of the first integral image and the second integral image by integrating values (for example, water-equivalent thicknesses) of amounts of energy loss obtained by converting each of the pixel values (the CT values) of the first pixels (voxels) where the treatment beam B is located until the treatment beam B reaches a region (a tumor) of an irradiation target on the path of the treatment beam B and the pixel values (the CT values) of the second pixels (voxels) where the treatment beam B radiated from the irradiation direction is located until the treatment beam B arrives at the region (the tumor) of the irradiation target on the path through which the treatment beam B passes. Thereby, the medical image processing device 200 can reduce the amount of processing (the amount of calculation) when the first integral image and the second integral image are generated.

Third Embodiment

A third embodiment will be described below. In a treatment plan in radiation treatment, as described above, a planner (such as a doctor) of the treatment plan designates a boundary between a tumor (lesion) region and a region of normal tissue, a boundary between the tumor and a vital organ near the tumor, and the like with respect to a first image captured in the treatment planning phase (for example, a CT image captured by a CT photography device 16). In other words, in the treatment plan, for each patient P, information such as the position of a tumor and OAR for deciding the direction, the intensity, and the like of a treatment beam B to be radiated is designated. It takes a certain amount of time to designate information such as the position of the tumor and the OAR in this treatment plan. Accordingly, information such as the position of the tumor and the OAR in the treatment planning phase is generally not input with respect to the second image of the patient P immediately before treatment starts. Thus, in the conventional radiation treatment, treatment is performed on the assumption that the position of the tumor located within the body of the patient P immediately before treatment starts is the same as that in the treatment plan. Thus, in the conventional radiation treatment, it is not easy to cope with a change in the position of the tumor over time that is likely to occur during treatment. Therefore, the third embodiment proposes a configuration and a calculation method for paying attention to a local portion where the tumor is located by identifying a location having an image pattern similar to that of the tumor designated for a first image in the treatment plan with respect to a second image of the patient P immediately before the treatment starts and causing the decision of the amount of movement of the patient table 12 for aligning the current body posture of the patient P with the body posture of the patient P in the treatment planning phase to correspond to a change in the position of the tumor over time.

The configuration of the treatment system including the medical image processing device of the third embodiment is a configuration in which the medical image processing device 100 is replaced with a medical image processing device 300 of the third embodiment in the configuration of the treatment system 1 including the medical image processing device 100 of the first embodiment shown in FIG. 1. In the following description, the treatment system including the medical image processing device 300 will be referred to as a "treatment system 3."

In the following description, in the components of the treatment system 3 including the medical image processing device 300, components similar to those of the treatment system 1 including the medical image processing device 100 of the first embodiment are denoted by the same reference signs, detailed description of the components will be omitted, and differences will be mainly described.

As in the medical image processing device 100 of the first embodiment, the medical image processing device 300 performs a process of aligning the position of the patient P when radiation treatment is performed on the basis of a CT image output by a CT photography device 16 and outputs a movement amount signal SM for moving the patient table 12 to the patient table controller 14 so that the irradiation direction of the treatment beam B radiated from a treatment beam irradiation gate 18 is aligned with the direction set in the treatment planning phase. The medical image processing device 300 can pay attention to a local portion where the tumor inside of the body of the patient P is located and determine the amount of movement of the patient table 12 so that energy applied to the tumor inside of the body of the patient P by the radiated treatment beam B is close to energy planned in the treatment planning phase.

Figure 7:
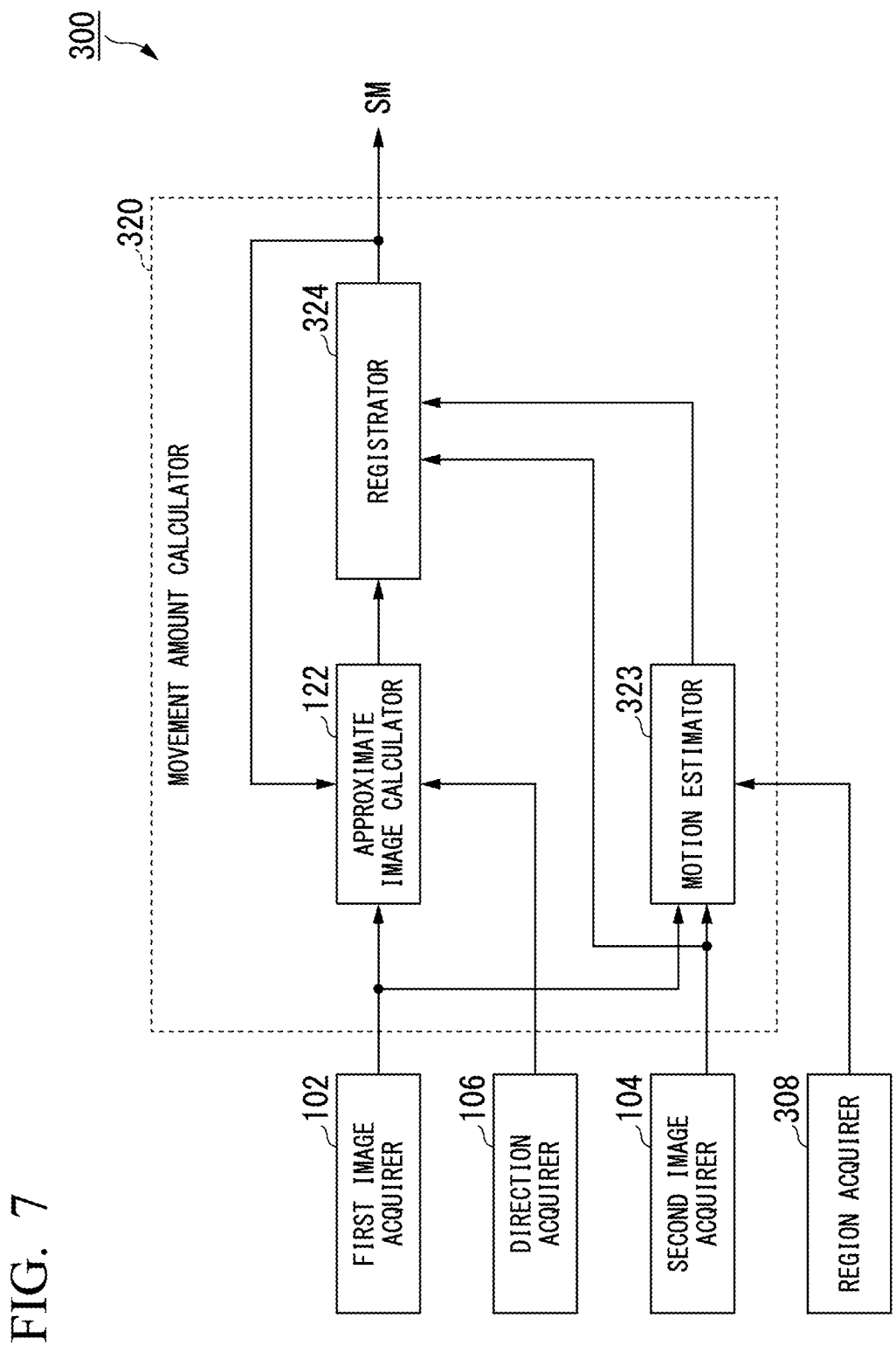
FIG. 7 is a block diagram showing a schematic configuration of a medical image processing device of a third embodiment.

The configuration of the medical image processing device 300 constituting the treatment system 3 will be described below. FIG. 7 is a block diagram showing a schematic configuration of the medical image processing device 300 according to the third embodiment. The medical image processing device 300 includes a first image acquirer 102, a second image acquirer 104, a direction acquirer 106, a region acquirer 308, and a movement amount calculator 320. The movement amount calculator 320 includes an approximate image calculator 122, a motion estimator 323, and a registrator 324.

The region acquirer 308 acquires information of a region related to the tumor designated for the first image of the patient P in the treatment planning phase. The region acquirer 308 acquires, for example, the position of the tumor and information of a region such as PTV or OAR as the information of the region related to the tumor (hereinafter referred to as "region information"). If an image from which the region acquirer 308 acquires the region information is not limited to the first image and is an image in which the region related to the tumor is designated in the treatment planning phase, it may be, for example, the second image or an image including a region related to the tumor estimated in an image captured at the time of previous radiation treatment. The region acquirer 308 outputs the acquired region information to the movement amount calculator 320, more specifically, the motion estimator 323.

The motion estimator 323 copies the tumor or the region such as PTV or OAR included in the first image to the second image on the basis of the first image output by the first image acquirer 102, the second image output by the second image acquirer 104, and the region information output by the region acquirer 308. The motion estimator 323 generates a motion model by estimating a change (motion) of the position of the tumor inside of the second image or the like on the basis of the region such as the tumor copied to the second image. The motion estimator 323 outputs the generated motion model to the registrator 324.

The registrator 324 calculates amounts of deviation in the position and orientation between the first image and the second image together with the motion of the tumor on the basis of the approximate image of the first image output by the approximate image calculator 122, the second image output by the second image acquirer 104, and the motion model output by the motion estimator 323. The registrator 324 determines the amount of movement of the patient table 12 for aligning the current body posture of the patient P shown in the second image with the body posture of the patient P in the treatment planning phase shown in the first image on the basis of the calculated amounts of deviation and outputs a movement amount signal SM indicating the determined amount of movement of the patient table 12 to the patient table controller 14.

(Motion Model Estimation Method)

Next, a method in which the motion estimator 323 estimates a motion model will be described. In the following description, an estimation method for estimating a motion model for designating the motion of the position of the tumor located within the second image or the like on the basis of a region related to the tumor designated with respect to the first image indicated in the region information output by the region acquirer 308 will be described.

In the motion model estimation process of the motion estimator 323, the motion of the region within the second image similar to the image within the region of the tumor designated for the first image is calculated. As a method, the motion estimator 323 uses, for example, template matching technology. More specifically, the motion estimator 323 uses an image representing the region of the tumor designated for the first image as a template and searches for the position of the most similar image as the position of the tumor within the second image by performing a template matching process for the second image. Subsequently, the motion estimator 323 obtains motion vectors of the position of the tumor within the found second image and uses all obtained motion vectors as the motion model. The motion estimator 323 may divide the region of the tumor used as the template into a plurality of regions that are small (hereinafter referred to as "small regions") and use an image representing each of the small regions after the division as a template. In this case, the motion estimator 323 performs template matching for each small region template to search for the position of the tumor with highest similarity within the second image for each small region. Subsequently, the motion estimator 323 obtains the motion vector of the position of the tumor within the second image corresponding to each of the found small regions and uses all the obtained motion vectors as the motion model. The motion estimator 323 may use an average vector, a median vector, or the like of the obtained motion vectors as the motion model.

The motion estimator 323 may obtain the motion of a region within the second image having a distribution similar to that of pixel values within the region of the tumor designated for the first image. As a method, the motion estimator 323 may use, for example, technology for searching for positions where histograms of pixel values are similar using a mean shift, a medoid shift, or the like, and tracking a physical object. At this time, the motion estimator 323 generates a motion model using the histogram distribution of pixel values obtained using all pixel values within the region of the tumor designated for the first image. The motion estimator 323 may divide the region of the tumor designated for the first image into a plurality of small regions and generate a motion model corresponding to each small region using the histogram distribution of the pixel values obtained using the pixel values within the region for each small region after the division. In this case, the motion estimator 323 may combine a plurality of motion models corresponding to the small regions as a motion model group or may use a mean vector or a median vector of the motion model group as the motion model.

The motion estimator 323 outputs the motion model generated as described above to the registrator 324.

Thereby, the registrator 324 calculates the amounts of deviation in the position and orientation between the first image and the second image together with the motion of the tumor as described above. At this time, the registrator 324 uses the cost function $E(\Delta V, \Omega)$ represented by the following Eq. (25) to calculate an amount of movement $\Delta V$ including the amounts of deviation in the position and orientation between the first image and the second image together with the motion of the tumor.

[Math. 25]

$$E(\Delta V, \Omega) = \sum_{i \in \Omega} [(I_i(V + \Delta V) - T_{m(i)}(V))]^2 \qquad (25)$$

In the above Eq. (25), $\Omega$ denotes a set of positions within the region related to the tumor designated for the first image, acquired by the region acquirer 308. Eq. (26) is a function of the position converted by the motion model of the region related to the tumor designated for the first image. If the motion model is, for example, a motion model obtained by modeling one of mean vectors of all motion vectors of the position of the tumor within the second image, Eq. (26) of the function represents that the position of the tumor is shifted by the mean shift.

[Math. 26]

$$m(i), i \in R^3 \qquad (26)$$

Subsequently, the registrator 324 determines the amount of movement (the amount of translation and the amount of rotation) of the patient table 12 on the basis of the amount of movement $\Delta V$ calculated using the cost function $E(\Delta V, \Omega)$ of the above Eq. (25) and outputs a movement amount signal SM indicating the determined amount of movement of the patient table 12 to the patient table controller 14.

In the movement amount calculation process of the medical image processing device 300, it is only necessary to add a process of the region acquirer 308 and a process of the motion estimator 323 to the movement amount calculation process of the medical image processing device 100 of the first embodiment shown in FIG. 3. More specifically, in the movement amount calculation processing of the medical image processing device 100 of the first embodiment shown in FIG. 3, it is only necessary to add a process in which the region acquirer 308 acquires region information of the tumor designated for the first image after step S102 and add a process in which the motion estimator 323 estimates a motion of the position of the tumor or the like within the second image and generates a motion model before step S106. Accordingly, detailed description of a flow of the movement amount calculation process of the medical image processing device 300 will be omitted.

According to this configuration and operation, the medical image processing device 300 generates the motion model by acquiring the region information of the tumor designated for the first image in the movement amount calculation process, copying the region of the tumor on the basis of the acquired region information to the second image, and estimating a change (a motion) in the position of the tumor or the like within the second image. Even in the medical image processing device 300, as in the medical image processing device 100 of the first embodiment, the approximate image calculator 122 calculates an approximate image from the first image. Subsequently, the registrator 324 calculates the amounts of deviation in the position and orientation between the first image and the second image, i.e., the amount of deviation between the body posture of the patient P in the treatment planning phase and the current body posture of the patient P, together with the motion of the tumor on the basis of the approximate image, the second image, and the motion model. In the movement amount calculation process of the medical image processing device 300, as in the movement amount calculation process of the medical image processing device 100 of the first embodiment, the calculation of the approximate image and the calculation of the amount of deviation are iterated, the amount of movement for moving the patient table 12 is determined on the basis of the amount of deviation when the amount of deviation between the approximate image and the second image is less than or equal to a prescribed threshold value, and a movement amount signal SM indicating the determined amount of movement of the patient table 12 is output to the patient table controller 14. Thereby, even in the treatment system 3 including the medical image processing device 300, as in the treatment system 1 including the medical image processing device 100 of the first embodiment, it is possible to radiate the treatment beam B of the amount of energy planned in the treatment planning phase to the tumor and perform the radiation treatment as planned by actually moving the patient P in accordance with the amount of movement of the patient table 12 determined in the movement amount calculation process of the medical image processing device 300.

Moreover, according to the configuration of the region acquirer 308, the motion estimator 323, and the registrator 324 in the medical image processing device 300, attention is paid to a local portion where the tumor designated for the first image of the patient P in the treatment planning phase is located and the amount of deviation between the current body posture of the patient P and the body posture of the patient P in the treatment planning phase is calculated together with the motion of the tumor. Thereby, the medical image processing device 300 can align the position of the patient P corresponding to a change over time in the position of the tumor that is likely to occur during radiation treatment.

As described above, even in the medical image processing device 300, as in the medical image processing device 100 of the first embodiment, the first image acquirer 102 acquires the first image of the patient P captured before treatment and the parameters indicating the position and the orientation when the first image has been captured and the second image acquirer 104 acquires the second image of the patient P captured immediately before treatment starts and the parameters indicating the position and the orientation when the second image has been captured. Furthermore, even in the medical image processing device 300, the direction acquirer 106 acquires information about the direction within the treatment room. Subsequently, even in the medical image processing device 300, the approximate image calculator 122 provided in the movement amount calculator 320 calculates an approximate image by converting (approximating) the first image. Further, in the medical image processing device 300, the region acquirer 308 acquires region information of a region related to the tumor designated for the first image of the patient P in the treatment planning phase and the motion estimator 323 provided in the movement amount calculator 320 generates a motion model by estimating a change (a motion) in the position of the tumor or the like within the second image. Subsequently, in the medical image processing device 300, the registrator 324 provided in the movement amount calculator 320 calculates amounts of deviation in the position and orientation between the first image and the second image together with the motion of the tumor on the basis of the approximate image, the second image, and the motion model, determines the amount of movement of the patient table 12, i.e., the final amount of movement of the patient P, on the basis of the calculated amounts of deviation, and outputs a movement amount signal SM indicating the determined amount of movement of the patient table 12 to the patient table controller 14. Thereby, even in the treatment system 3 including the medical image processing device 300, as in the treatment system 1 including the medical image processing device 100 of the first embodiment, the patient table controller 14 causes the position of the patient table 12 to move on the basis of the movement amount signal SM, so that the position of the patient P is actually moved. Thereby, even in the treatment system 3 including the medical image processing device 300, as in the treatment system 1 including the medical image processing device 100 of the first embodiment, it is possible to perform radiation treatment as planned by aligning the current position of the patient P in a state in which the treatment beams B corresponding to the amount of energy close to the energy determined in the treatment planning phase can be radiated to the tumor inside of the body of the patient P. Moreover, because the treatment system 3 including the medical image processing device 300 can determine the amount of movement of the patient table 12 together with the motion of the tumor inside of the body of the patient P, it is possible to perform radiation treatment by radiating the treatment beams B corresponding to the amount of energy closer to the energy determined in the treatment planning phase to the tumor inside of the body of the patient P as compared with the treatment system 1 including the medical image processing device 100 of the first embodiment.

The medical image processing device 300 has a configuration in which a component associated with the estimation of the motion of the tumor is added or replaced in the configuration of the medical image processing device 100 of the first embodiment shown in FIG. 2. More specifically, the medical image processing device 300 has a configuration in which the region acquirer 308 is added to the medical image processing device 100 of the first embodiment, the motion estimator 323 is added to the movement amount calculator 120 provided in the medical image processing device 100, and the registrator 124 is replaced with the registrator 324. Likewise, the components associated with the estimation of the motion of the tumor can be changed as in the configuration of the medical image processing device 200 of the second embodiment shown in FIG. 4. It is only necessary for a configuration, operation, process, and calculation method in this case to be configured to be equivalent to the configuration, operation, process, and calculation method of the medical image processing device 300 described above. Accordingly, a detailed description of the configuration, operation, process, and calculation method when the medical image processing device 200 of the second embodiment is configured to estimate the motion of the tumor will be omitted.

As described above, in the medical image processing device 300, the region acquirer 308 acquires region information of a region related to the tumor designated for the first image of the patient P in the treatment planning phase and the motion estimator 323 provided in the movement amount calculator 320 generates a motion model by estimating a change (motion) in the position of the tumor or the like within the second image. Subsequently, in the medical image processing device 300, the registrator 324 provided in the movement amount calculator 320 calculates amounts of deviation in the position and orientation between the first image and the second image together with the motion of the tumor on the basis of the approximate image, the second image, and the motion model, determines the amount of movement of the patient table 12, i.e., the final amount of movement of the patient P, on the basis of the calculated amounts of deviation, and outputs a movement amount signal SM indicating the determined amount of movement of the patient table 12 to the patient table controller 14. Thereby, even in the treatment system 3 including the medical image processing device 300, as in the treatment system 1 including the medical image processing device 100 of the first embodiment, the patient table controller 14 causes the patient table 12 to move on the basis of the movement amount signal SM, so that the position of the patient P is actually moved. Thereby, even in the treatment system 3 including the medical image processing device 300, as in the treatment system 1 including the medical image processing device 100 of the first embodiment, it is possible to perform radiation treatment as planned by aligning the current position of the patient P in a state in which the treatment beams B corresponding to the amount of energy close to the energy determined in the treatment planning phase can be radiated to the tumor inside of the body of the patient P. Moreover, because the treatment system 3 including the medical image processing device 300 can determine the amount of movement of the patient table 12 together with the motion of the tumor inside of the body of the patient P, it is possible to perform radiation treatment by radiating the treatment beams B corresponding to the amount of energy closer to the energy determined in the treatment planning phase to the tumor inside of the body of the patient P as compared with the treatment system 1 including the medical image processing device 100 of the first embodiment.

As described above, the medical image processing device 300 further includes the region acquirer 308 configured to acquire region information about a region of a tumor inside of the body of the patient P on the basis of the treatment plan for the patient P, the movement amount calculator 320 further includes the motion estimator 323 configured to estimate motion of the tumor on the basis of the first image, the second image, and the region information, and the registrator 324 outputs the movement amount signal SM based on the amount of deviation including the motion of the tumor estimated by the motion estimator 323. Thereby, the medical image processing device 300 can calculate the amount of deviation between the body posture of the patient P in the treatment planning phase and the current body posture of the patient P on the basis of the first image, the second image, the direction information, and the region information together with the change (motion) in the tumor and determine the amount of movement for aligning the current position of the patient P with the position when the first image has been captured in the treatment planning phase.

As described above, the region information may include at least a region of a tumor (a lesion) and a region of an organ at risk (OAR) located near the tumor (lesion).

Fourth Embodiment

A fourth embodiment will be described below. A process in which, after the position alignment of a patient P is performed by the medical image processing device of each of the first to third embodiments, a radiation treatment practitioner, i.e., a doctor who is a user of a treatment system, confirms the position alignment result and further performs fine adjustment of the position and orientation of the patient P is conceivable. Therefore, a configuration in which a medical image processing device confirms the result of aligning the position of the patient P and performs fine adjustment of the position and orientation of the patient P will be described in the fourth embodiment. In the following description, a configuration in which the result of aligning the position of the patient P is confirmed and the fine adjustment is performed will be described using the medical image processing device 100 of the first embodiment shown in FIG. 2 as a representative example. In the following description, a medical image processing device 100a of the fourth embodiment will be referred to as a "medical image processing device 100a" and a treatment system including the medical image processing device 100a will be referred to as a "treatment system 1a."

Figure 8:
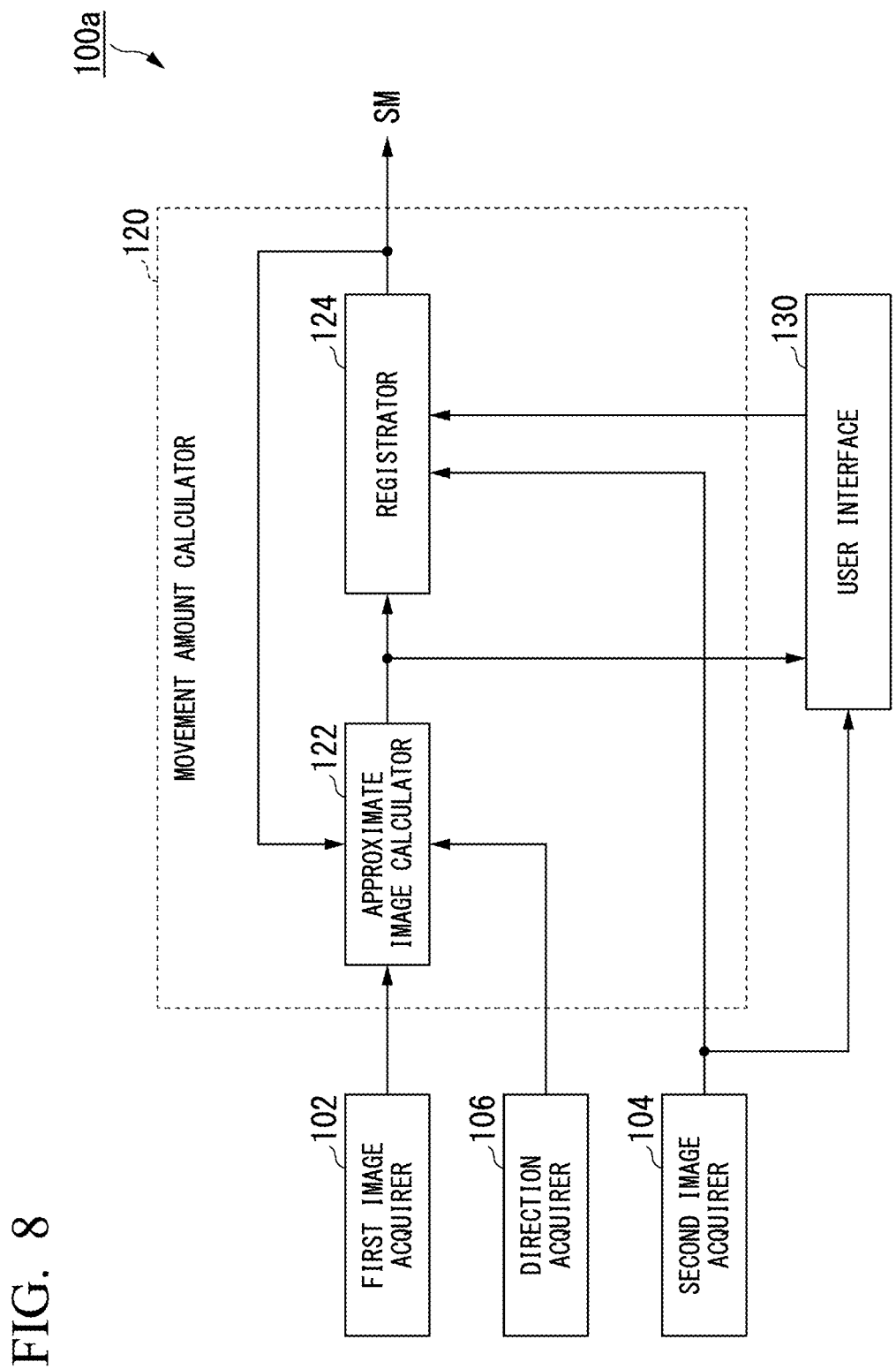
FIG. 8 is a block diagram showing a schematic configuration of a medical image processing device of a fourth embodiment.

FIG. 8 is a block diagram showing a schematic configuration of a medical image processing device 100a of the fourth embodiment. The medical image processing device 100a includes, for example, a first image acquirer 102, a second image acquirer 104, a direction acquirer 106, a movement amount calculator 120, and a user interface 130. The movement amount calculator 120 includes, for example, an approximate image calculator 122 and a registrator 124. The medical image processing device 100a has a configuration in which the user interface 130 is added to the medical image processing device 100 of the first embodiment.

The second image acquirer 104 also outputs the acquired second image to the user interface 130. The approximate image calculator 122 provided in the movement amount calculator 120 also outputs a calculated approximate image to the user interface 130. Alternatively or additionally, the first image acquirer 102 may also output an acquired first image to the user interface 130.

The user interface 130 includes a display device configured to present the result of aligning the position of the patient P to a user (a doctor or the like) of the treatment system 1a having the medical image processing device 100a and an input device configured to receive inputs for various operations by a user. The display device provided in the user interface 130 is, for example, a liquid crystal display (LCD) or the like. For example, the user interface 130 generates an image in which an approximate image output by the approximate image calculator 122 (which may be a first image output by the first image acquirer 102) and a second image output by the second image acquirer 104 overlap and causes the display device to display the generated image as a result of aligning the position of the patient P.

The input devices provided in the user interface 130 are an input device such as a keyboard, a pointing device such as a mouse and a pen-type stylus, and an operation device such as a button or a switch. The user interface 130 receives an operation of the input device by the user, more specifically, an operation for fine adjustment of the position and orientation of the patient P, and outputs information indicating the received operation to the registrator 124 provided in the movement amount calculator 120. The operation received by the user interface 130 may be, for example, an operation of setting a parameter for designating a region within a three-dimensional space or an operation of setting a parameter in a cost function. The operation received by the user interface 130 may be, for example, an operation of setting the direction within the treatment room acquired by the direction acquirer 106. In this case, the user interface 130 outputs information indicated by the received operation to the direction acquirer 106.

The user interface 130 may include a pressure sensor as an input device and may be configured as a touch panel combined with the display device. In this case, the user interface 130 detects and receives various touch (tap, flick, and the like) operations performed by the user on an image displayed on the display device by the pressure sensor and outputs received information indicated by the input operation of the user to the registrator 124 (or the direction acquirer 106).

Here, an image display process and an operation input process in the user interface 130 will be described. Because the approximate image (which may be the first image) and the second image are three-dimensional images, it is difficult to directly display the images on a display device that performs a two-dimensional display process. Therefore, the user interface 130 generates one or more cross-sectional images corresponding to each of the approximate image and the second image and causes the display device to display the one or more cross-sectional images. At this time, the user interface 130 displays a differential image between the cross-sectional images so that visual comparison between the approximate image and the second image is facilitated. The user interface 130 may display a color map that is color-coded in accordance with a magnitude of a difference value between the cross-sectional images. The user interface 130 may superimpose and display the contours of PTV, PRV, and the like. The user interface 130 may cause a value of the cost function for each PTV or PRV to be displayed as information. Thereby, the user can confirm the cross-sectional images of the approximate image and the second image displayed on the display device and determine deviation between the approximate image and the second image, i.e., determine whether or not to finely adjust the position and orientation of the patient P. When the user operates the input device to finely adjust the position and orientation of the patient P, the user interface 130 outputs information indicating the adjustment values for the fine adjustment input by the input device to the registrator 124. Thereby, the registrator 124 outputs the movement amount signal SM reflecting the adjustment value input by the user interface 130 to the patient table controller 14. The patient table controller 14 causes the patient table 12 to move so that the current body posture of the patient P becomes a body posture finely adjusted by the user in accordance with the movement amount signal SM output by the registrator 124 provided in the movement amount calculator 120.

Figure 9:
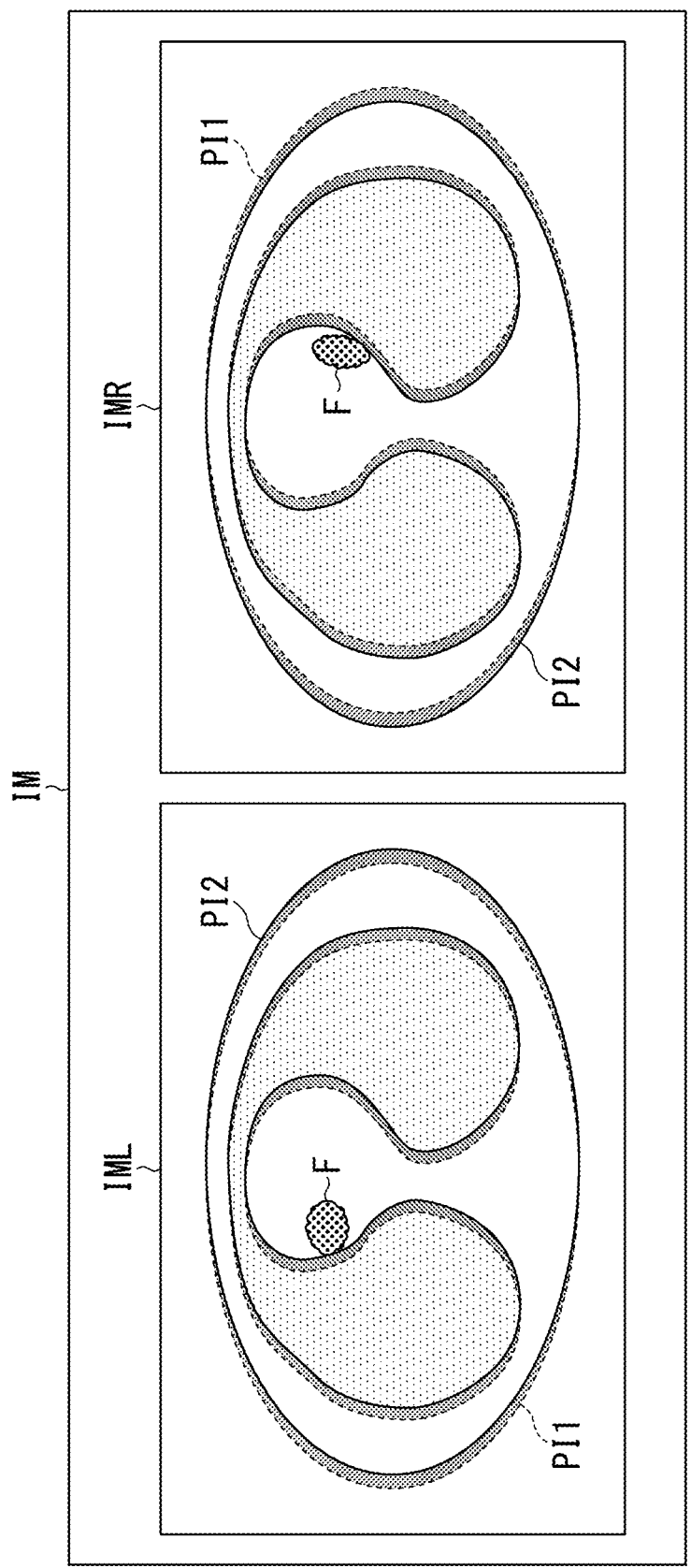
FIG. 9 is a diagram showing an example of a display screen displayed on a display device by a user interface provided in the medical image processing device of the fourth embodiment.

An example of an image displayed on the display device by the user interface 130 will be described. FIG. 9 is a diagram showing an example of a display screen displayed on the display device by the user interface 130 provided in the medical image processing device 100a of the fourth embodiment. In FIG. 9, an example of a screen IM of the display device on which the user interface 130 displays an image is shown. In FIG. 9, an image IML and an image IMR viewed from different directions (for example, the left and right of the patient P) are displayed on the left and right sides of the screen IM. Each of the image IML and the image IMR is an image obtained by superimposing the cross-sectional images of a cross-sectional image PI1 of the approximate image and a cross-sectional image PI2 of the second image. A tumor F viewed from the corresponding direction is also superimposed and displayed on each of the images IML and IMR. Furthermore, in each of the image IML and the image IMR, the deviation between the current body posture of the patient P and the body posture of the patient Pin the treatment planning phase is highlighted (made conspicuous) by coloring a location where there is deviation between the cross-sectional image PI1 and the cross-sectional image PI2 (i.e., a location where there is deviation in the body surface of the patient Por the outline of the tissue inside of the body).

The user can easily confirm the deviation between the current body posture of the patient P and the body posture of the patient P in the treatment planning phase by viewing the image IML and the image IMR within the screen IM. The user can perform an operation of finely adjusting the position or orientation of the patient P with respect to the input device while visually confirming the deviation between the current body posture of the patient P and the body posture of the patient P in the treatment planning phase using each of the images IML and IMR. At this time, the user interface 130 may generate a new image in which the fine adjustment operated by the user is virtually reflected in the image IML and the image IMR and cause the currently displayed images IML and IMR to be sequentially updated. That is, the user interface 130 may sequentially present the result of fine adjustment by the user. Thereby, the user can perform a fine adjustment operation while sequentially confirming a state in which a location where there is deviation between the cross-sectional image PI1 and the cross-sectional image PI2 highlighted (made conspicuous) in each of the images IML and IMR is eliminated in the fine adjustment operation. When the deviation between the cross-sectional images PI1 and PI2 is eliminated or located within an allowable range, the user can perform radiation treatment by radiating the treatment beam B to the tumor inside of the body of the patient P.

The movement amount calculation process of the medical image processing device 100a is similar to the movement amount calculation process of the medical image processing device 100 of the first embodiment shown in FIG. 3, except that a display or input process of the user interface 130 is different. Accordingly, a detailed description of a flow of the movement amount calculation process of the medical image processing device 100a will be omitted.

According to this configuration and operation, the medical image processing device 100a presents a result of aligning the position of the patient P in the treatment planning phase with the current position of the patient P to the user (the doctor or the like) of the treatment system 1a including the medical image processing device 100a by causing the display device provided in the user interface 130 to display the result. Thereby, the user of the treatment system 1a including the medical image processing device 100a can visually confirm the deviation between the position of the patient P in the treatment planning phase and the current position of the patient P and can determine whether or not to finely adjust the current body posture of the patient P. When the user determines to finely adjust the body posture of the patient P, it is possible to perform an operation of finely adjusting the position or orientation of the patient P on the cross-sectional images of the approximate image and the second image displayed on the display device by operating the input device constituting the user interface 130 while visually confirming the deviation in the body posture of the patient P displayed on the display device. The medical image processing device 100a outputs the final movement amount signal SM reflecting the adjustment value finely adjusted by the user to the patient table controller 14. Thereby, the patient table controller 14 causes the patient table 12 to move so that the current body posture of the patient P becomes a body posture finely adjusted by the user in accordance with the movement amount signal SM output by the medical image processing device 100a. That is, thereby, in the treatment system 1a including the medical image processing device 100a, when the body posture of the patient P becomes a body posture suitable for performing radiation treatment, it is possible to radiate the treatment beam B with the amount of energy planned in the treatment plan to the tumor and perform radiation treatment as planned.

As described above, in the medical image processing device 100a of the fourth embodiment, as in the medical image processing device 100 of the first embodiment, the movement amount signal SM indicating the amount of movement of the patient table 12 is output to the patient table controller 14. Furthermore, the medical image processing device 100a of the fourth embodiment presents the result of aligning the position of the patient P to the user and accepts fine adjustment of the position of the patient P by the user. In the medical image processing device 100a of the fourth embodiment, the movement amount signal SM reflecting the fine adjustment input by the user is output to the patient table controller 14. Thereby, in the treatment system 1a including the medical image processing device 100a, the patient table controller 14 causes the patient table 12 to move actually on the basis of the movement amount signal SM, so that the position of the patient P is actually moved to a position reflecting the fine adjustment by the user. Thereby, in the treatment system 1a including the medical image processing device 100a, it is possible to irradiate the tumor with treatment beams B corresponding to the amount of energy planned in the treatment plan and perform radiation treatment as planned by actually moving the current position of the patient P to a position desired by the user suitable for performing radiation treatment.

The medical image processing device 100a has a configuration in which the user interface 130 is provided in the configuration of the medical image processing device 100 of the first embodiment shown in FIG. 2. However, the user interface 130 is not limited to the configuration provided in the medical image processing device 100 of the first embodiment and may be configured to be provided in the medical image processing device 200 of the second embodiment or the medical image processing device 300 of the third embodiment. Furthermore, the user interface 130 is not limited to a configuration provided as a component of the medical image processing device, and may have a configuration provided in the treatment system, i.e., a configuration provided outside of the medical image processing device. It is only necessary for a configuration, operation, process, and calculation method in this case to be configured to be equivalent to the configuration, operation, process, and calculation method of the medical image processing device 100a described above. Accordingly, a detailed description of the configuration, operation, process, and calculation method of another medical image processing device including the user interface 130 or the treatment system including the medical image processing device will be omitted.

As described above, the medical image processing device 100a further includes the user interface 130 having a display device for displaying at least an image for confirming the amount of deviation calculated by the registrator 124. Thereby, the medical image processing device 100a can present a result of aligning the position of the patient P in the treatment planning phase with the current position of the patient P to the user (the doctor or the like) of the treatment system 1a including the medical image processing device 100a.

As described above, in the medical image processing device 100a, the user interface 130 further includes an input device for inputting an adjustment value for adjusting the amount of movement set on the basis of the image displayed on the display device and the registrator 124 may output the movement amount signal SM in which the amount of movement is adjusted by the adjustment value input to the input device. Thereby, the medical image processing device 100a can output the movement amount signal SM reflecting the adjustment value input by the user (the doctor or the like) of the treatment system 1a including the medical image processing device 100a.

In the second embodiment, the third embodiment, and the fourth embodiment, the configurations in which the featured components in each embodiment are added to the medical image processing device 100 of the first embodiment have been described. However, the featured components in the embodiments are not exclusive and can coexist. For example, the integral image calculator 221 provided in the medical image processing device 200 of the second embodiment, the region acquirer 308 and the motion estimator 323 provided in the medical image processing device 300 of the third embodiment, and the user interface 130 provided in the medical image processing device 100a of the fourth embodiment may be provided in one medical image processing device. In this case, the other components provided in the medical image processing device are changed as appropriate to implement functions corresponding to the components.

In each embodiment, the case where an original image for calculating the approximate image in the approximate image calculator 122 (or the approximate image calculator 222) is the first image (or the first integral image corresponding to the first image) has been described. In other words, the case where the reference image for calculating the amount of deviation in the registrator 124 (or the registrator 324) is the second image (or the second integral image corresponding to the second image) has been described. However, the original image for calculating the approximate image and the reference image for calculating the amount of deviation may be exchanged with each other. That is, the approximate image calculator 122 (or the approximate image calculator 222) may calculate the approximate image by moving (translating and rotating) the second image (or the second integral image corresponding to the second image) and the registrator 124 (or the registrator 324) may calculate the amount of deviation with reference to the first image (or the first integral image corresponding to the first image). It is only necessary for a configuration, operation, process, and calculation method of the medical image processing device of each embodiment in this case to be configured to be equivalent to the configuration, operation, process, and calculation method of the medical image processing device 100 of each embodiment described above.

In each embodiment, the configuration in which the medical image processing device and the treatment device 10 are separate devices has been described. However, the medical image processing device and the treatment device 10 are not limited to separate devices and the medical image processing device and the treatment device 10 may be configured to be integrated.

As described above, for example, a medical image processing method, which is executed by the medical image processing device 100, includes acquiring, by a computer (a processor or the like), a three-dimensional first image (for example, a CT image) obtained by photographing the inside of a body of the patient P; acquiring, by the computer, a three-dimensional second image (for example, a CT image) of the inside of the body of the patient P imaged at a timing different from that of the first image; acquiring, by the computer, information about an irradiation direction of a treatment beam B to the patient P in a treatment room; and outputting, by the computer, a movement amount signal SM indicating the amount of movement of the second image to be moved to align the position of the patient P shown in the second image with the position of the patient P shown in the first image on the basis of the path of the treatment beam B set in the first image and the direction information about the irradiation direction.

As described above, for example, a program, which is executed by the medical image processing device 100, causes a computer (a processor or the like) to acquire a three-dimensional first image (for example, a CT image) obtained by photographing the inside of a body of the patient P; acquire a three-dimensional second image (for example, a CT image) of the inside of the body of the patient P imaged at a timing different from that of the first image; acquire information about an irradiation direction of a treatment beam B to the patient P in a treatment room; and output a movement amount signal SM indicating the amount of movement of the second image to be moved to align the position of the patient P shown in the second image with the position of the patient P shown in the first image on the basis of the path of the treatment beam B set in the first image and the information about the irradiation direction.

According to at least one embodiment described above, there are provided a first image acquirer (102) configured to acquire a three-dimensional first image obtained by photographing the inside of a body of a patient (P); a second image acquirer (104) configured to acquire a three-dimensional second image of the inside of the body of the patient (P) imaged at a timing different from that of the first image; a direction acquirer (106) configured to acquire information (direction information) about an irradiation direction of radiation (a treatment beam B) to the patient (P) in a treatment room; and a movement amount calculator (120) configured to output a movement amount signal (SM) indicating the amount of movement of the second image to be moved to align the position of the patient (P) shown in the second image with the position of the patient shown in the first image on the basis of the path of the radiation (the treatment beam B) set in the first image and the information (the direction information) about the irradiation direction. Thereby, the patient (P) fixed to the patient table (12) can be moved so that the radiation (the treatment beam B) of the amount of energy planned in the treatment plan can be radiated to a tumor (a lesion).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical image processing device comprising:
   a first image acquirer configured to acquire a three-dimensional first image obtained by photographing the inside of a body of a patient;
   a second image acquirer configured to acquire a three-dimensional second image of the inside of the body of the patient imaged at a timing different from that of the first image;
   a direction acquirer configured to acquire information about an irradiation direction of radiation to the patient in a treatment room; and
   a movement amount calculator configured to output a movement amount signal indicating an amount of movement of the second image to be moved to align a position of the patient shown in the second image with a position of the patient shown in the first image based on a path of the radiation set in the first image and the information about the irradiation direction,
   wherein the movement amount calculator includes:
      an approximate image calculator configured to calculate an approximate image generated by shifting the first image by a prescribed width for each degree of freedom to which a body posture of the patient changes based on the path of the radiation and the information about the irradiation direction; and
      a registrator configured to calculate an amount of deviation between the first image and the second image using the approximate image, determine the amount of movement based on the calculated amount of deviation, and output the movement amount signal indicating the determined amount of movement.

2. The medical image processing device according to claim 1, wherein the movement amount calculator further includes an integral image calculator configured to calculate a first integral image obtained by integrating pixel values of three-dimensional first pixels included in the first image and through which the radiation passes along the path of the radiation and calculate a second integral image obtained by integrating pixel values of three-dimensional second pixels included in the second image and through which the radiation radiated from the irradiation direction passes,
   wherein the approximate image calculator calculates the approximate image based on the first integral image, and wherein the registrator outputs the movement amount signal based on an amount of deviation between the second integral image and the approximate image.

3. The medical image processing device according to claim 2, wherein the integral image calculator calculates the first integral image and the second integral image by performing an integral process after converting the pixel values of the first pixels located on the path of the radiation and the pixel values of the second pixels located on a path through which the radiation radiated from the irradiation direction passes using prescribed non-linear conversion.

4. The medical image processing device according to claim 3, wherein the integral image calculator converts each of the pixel values of the first pixels located on the path of the radiation and the pixel values of the second pixels located on the path through which the radiation radiated from the irradiation direction passes into a value indicating arrival energy for the radiation to arrive at each pixel using the non-linear conversion.

5. The medical image processing device according to claim 4, wherein the integral image calculator calculates each of the first integral image and the second integral image by integrating values of amounts of energy loss obtained by converting each of the pixel values of the first pixels where the radiation is located until the radiation reaches a region of an irradiation target on the path of the radiation and the pixel values of the second pixels where the radiation radiated from the irradiation direction is located until the radiation reaches the region of the irradiation target on the path through which the radiation passes.

6. The medical image processing device according to claim 1, further comprising a region acquirer configured to acquire region information about a region of a tumor inside of the body of the patient based on information of a treatment plan for the patient,
wherein the movement amount calculator further includes a motion estimator configured to estimate motion of the tumor based on the first image, the second image, and the region information, and
wherein the registrator outputs the movement amount signal based on the amount of deviation including the motion of the tumor estimated by the motion estimator.

7. The medical image processing device according to claim 6, wherein the region information includes at least the region of the tumor and a region of an organ at risk located near the tumor.

8. The medical image processing device according to claim 1, further comprising a user interface including a display device configured to display at least an image for confirming the amount of deviation calculated by the registrator.

9. The medical image processing device according to claim 8,
wherein the user interface further includes an input device configured to input an adjustment value for adjusting the amount of movement set based on the image displayed on the display device, and
wherein the registrator outputs the movement amount signal obtained by adjusting the amount of movement by the adjustment value input to the input device.

10. The medical image processing device according to claim 1, wherein the movement amount signal is output to a patient table controller configured to control a patient table provided in a treatment device.

11. The medical image processing device according to claim 1,
wherein a region of an irradiation target of the radiation is a region of a tumor located inside of the body of the patient, and
wherein the path of the radiation includes the region of the tumor.

12. The medical image processing device according to claim 1, wherein the path through which the radiation radiated from the irradiation direction passes includes a region where irradiation of the radiation is avoided when the second image has been moved by the amount of movement indicated in the movement amount signal output by the movement amount calculator.

13. A treatment system comprising:
the medical image processing device according to claim 1; and
a treatment device including
an irradiator configured to irradiate the patient with radiation;
an imaging device configured to capture the first image and the second image;
a patient table configured to fix the patient after the patient is placed on the patient table; and
a patient table controller configured to control movement of the patient table in accordance with the movement amount signal.

14. A medical image processing device comprising:
a first image acquirer configured to acquire a three-dimensional first image obtained by photographing the inside of a body of a patient;
a second image acquirer configured to acquire a three-dimensional second image of the inside of the body of the patient imaged at a timing different from that of the first image;
a direction acquirer configured to acquire information about an irradiation direction of radiation to the patient in a treatment room; and
a movement amount calculator configured to output a movement amount signal indicating an amount of movement of the second image to be moved to align a position of the patient shown in the second image with a position of the patient shown in the first image based on a path of the radiation set in the first image and the information about the irradiation direction,
wherein the movement amount calculator includes:
an approximate image calculator configured to calculate a two-dimensional approximate image obtained by mapping the first image onto a plane based on the path of the radiation and information about the irradiation direction; and
a registrator configured to calculate the amount of deviation between the first image and the second image using the approximate image, determine the amount of movement based on the calculated amount of deviation, and output the movement amount signal indicating the determined amount of movement.

15. A medical image processing method comprising:
acquiring, by a computer, a three-dimensional first image obtained by photographing the inside of a body of a patient;
acquiring, by the computer, a three-dimensional second image of the inside of the body of the patient imaged at a timing different from that of the first image;
acquiring, by the computer, information about an irradiation direction of radiation to the patient in a treatment room; and
outputting, by the computer, a movement amount signal indicating an amount of movement of the second image to be moved to align a position of the patient shown in the second image with a position of the patient shown in the first image based on a path of the radiation set in the first image and the information about the irradiation direction, wherein the medical image processing method further comprises:

calculating an approximate image generated by shifting the first image by a prescribed width for each degree of freedom to which a body posture of the patient changes based on the path of the radiation and the information about the irradiation direction; and calculating an amount of deviation between the first image and the second image using the approximate image, determining the amount of movement based on the calculated amount of deviation, and outputting the movement amount signal indicating the determined amount of movement.

* * * * *